United States Patent
Powell

(10) Patent No.: US 11,523,071 B1
(45) Date of Patent: Dec. 6, 2022

(54) DISPARITY-PRESERVING BINNING FOR PHASE DETECTION AUTOFOCUS IN DIGITAL IMAGING SYSTEMS

(71) Applicant: Shenzhen Goodix Technology Co., Ltd., Shenzhen (CN)

(72) Inventor: Matthew Powell, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/486,838

(22) Filed: Sep. 27, 2021

(51) Int. Cl.
*H04N 5/347* (2011.01)
*H04N 5/369* (2011.01)
*H04N 5/374* (2011.01)
*H04N 5/378* (2011.01)

(52) U.S. Cl.
CPC ......... *H04N 5/347* (2013.01); *H04N 5/36961* (2018.08); *H04N 5/374* (2013.01); *H04N 5/378* (2013.01)

(58) Field of Classification Search
CPC .... H04N 5/347; H04N 5/36961; H04N 5/374; H04N 5/378
See application file for complete search history.

(56) References Cited

U.S. PATENT DOCUMENTS

| | | | | |
|---|---|---|---|---|
| 9,485,442 | B1* | 11/2016 | Li | H04N 5/36961 |
| 10,440,301 | B2* | 10/2019 | Li | H04N 5/36961 |
| 2022/0124264 | A1* | 4/2022 | Jang | H04N 5/36961 |
| 2022/0232183 | A1* | 7/2022 | Katayama | H04N 5/378 |

* cited by examiner

*Primary Examiner* — Nhan T Tran
*Assistant Examiner* — Chriss S Yoder, III
(74) *Attorney, Agent, or Firm* — Kilpatrick Townsend & Stockton LLP

(57) ABSTRACT

Techniques are described for disparity-preserving pixel binning during consistently binned parallel readout of an imaging sensor array having both phase detection autofocus (PDAF) pixels and imaging pixels. Each group of PDAF pixels and each group of imaging pixels is coupled with pixel actuators according to an particular arrangement, so that consistently applied control of the pixel actuators results in desired binning of both the PDAF pixels and the imaging pixels. According to some implementations, though such control of the pixel actuators is consistently applied across the pixels of the array, parallel readout of the sensor array yields diagonally binned imaging pixels, but vertically binned PDAF pixels to preserve horizontal PDAF disparity information. Additionally or alternatively, disparity-inducing structures are configured to position same-disparity PDAF pixels so that consistently applied control of the pixel actuators preserves disparity information during binning.

20 Claims, 15 Drawing Sheets

DISPARITY-PRESERVING BINNING FOR PHASE DETECTION AUTOFOCUS IN DIGITAL IMAGING SYSTEMS

TECHNICAL FIELD

This disclosure relates to digital imaging systems, and, more particularly, to disparity-preserving binning for phase detection autofocus in digital imaging systems, such as for smart phone cameras and/or other digital cameras.

BACKGROUND

Many electronic devices include digital imaging systems. For example, most modern smartphones include one or more digital cameras. Almost all modern digital cameras (and many other digital imaging systems) include autofocus features implemented according to various different autofocus approaches. Two common approaches are referred to as contrast detection autofocus (CDAF) and phase detection autofocus (PDAF). CDAF is based on the principle that higher contrast generally correlates with better focus. As such, CDAF approaches typically involve an iterative process of measuring contrast, adjusting focal settings, and measuring contrast again, until an optimal focal setting is found (e.g., at which a highest contrast image is formed). CDAF tends to produce very sharp focus, but the iterative approach can tend to be too slow to work well in applications, such as tracking of moving objects, focus during video capture, etc.

PDAF tends to produce an appreciably faster autofocus solution than does CDAF. PDAF is based on the principle that even a slight shift in the viewpoint from which an image is captured tends to shift the relative positions of each point by an amount and distance (i.e., a disparity) corresponding to the point's distance from the focal distance of the imaging system. For example, a point that is "in focus" may not have any disparity, a closer points may manifest a positive (or negative) disparity, and farther points may manifest a negative (or positive) disparity. As such, PDAF approaches typically use PDAF sensors to capture a same image concurrently from slightly different viewpoints, and data from the different viewpoints is used to compute disparity measurements. The imaging system can quickly adjust focus to an optimal focal setting based on the amount and direction of the disparity measurements.

Conventionally, the effectiveness of PDAF approaches can relate to the number of PDAF sensors being used to obtain data for different viewpoints. For example, a larger number of PDAF sensors can provide higher data resolution for the different viewpoints, which can tend to provide the PDAF system with more information with which to perform more accurate autofocusing. However, increasing the number of sensors can also yield increased hardware costs, increased processing times, decreased imaging resolution, decreased low-light focusing effectiveness, and/or other undesirable consequences.

SUMMARY

Embodiments provide systems and methods for disparity-preserving pixel binning during consistently binned parallel readout of an imaging sensor array having both phase detection autofocus (PDAF) pixels and imaging pixels. Each group of PDAF pixels and each group of imaging pixels is coupled with pixel actuators according to an particular arrangement, so that consistently applied control of the pixel actuators results in desired binning of both the PDAF pixels and the imaging pixels. According to some implementations, though such control of the pixel actuators is consistently applied across the pixels of the array, parallel readout of the sensor array yields vertically binned PDAF pixels (thereby preserving horizontal PDAF disparity information) and diagonally binned imaging pixels. According to other implementations, disparity-inducing structures are configured to position same-disparity PDAF pixels to be binned together in accordance with consistently applied control of the pixel actuators (e.g., by using diagonally placed metal shielding), such that the disparity information is preserved during the binning.

According to one set of embodiments, a system is provided for disparity-preserving binning of phase-detect autofocus (PDAF) pixels in an image sensor array. The system includes a pixel block, pixel actuators, and a controller. The pixel block has an array of photodetector elements including at least one square array of PDAF pixels interspersed with a plurality of imaging pixels, the at least one square array having first-disparity PDAF pixels each configured to generate a respective pixel response corresponding to a first disparity orientation, and second-disparity PDAF pixels each configured to generate a respective pixel response corresponding to a second disparity orientation that is complementary to the first disparity orientation. The pixel actuators are each coupled with a respective one of the PDAF pixels and a respective subset of the imaging pixels. The controller is to selectively actuate the pixel actuators to perform consistently binned parallel readout of the pixel block, such that the consistently binned parallel readout includes: concurrently actuating a first subset of the pixel actuators at a first time to output a combination of the respective pixel responses of the first-disparity PDAF pixels as a first binned pixel response corresponding to the first disparity orientation; and concurrently actuating a second subset of the pixel actuators at a second time to output a combination of the respective pixel responses of the second-disparity PDAF pixels as a second binned pixel response corresponding to the second disparity orientation.

According to another set of embodiments, a method is provided for disparity-preserving binning of phase-detect autofocus (PDAF) pixels in an image sensor array. The method includes executing a consistently binned parallel readout of a pixel block having an array of photodetector elements having at least one square array of PDAF pixels interspersed with imaging pixels, the at least one square array including first-disparity PDAF pixels each configured to generate a respective pixel response corresponding to a first disparity orientation, and second-disparity PDAF pixels each configured to generate a respective pixel response corresponding to a second disparity orientation that is complementary to the first disparity orientation. The executing includes: first resetting a readout circuit configured to generate a pixel output signal based on an actuation state of a plurality of pixel actuators, each coupled with a respective one of the PDAF pixels and a respective subset of the imaging pixels; first concurrently actuating a first subset of the pixel actuators, subsequent to the first resetting, to output a combination of the respective pixel responses of the first-disparity PDAF pixels as a first binned pixel response corresponding to the first disparity orientation, thereby causing the readout circuit to generate the pixel output signal as a first binned pixel output corresponding to the first disparity orientation; second resetting the readout circuit to reset the pixel output signal subsequent to the first concurrently actuating; and second concurrently actuating a second subset of the pixel actuators, subsequent to the second resetting, to output a combination of the respective pixel responses of the second-disparity PDAF pixels as a second binned pixel response corresponding to the second disparity orientation, thereby causing the readout circuit to generate the pixel output signal as a second binned pixel output corresponding to the second disparity orientation.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Figure 1:
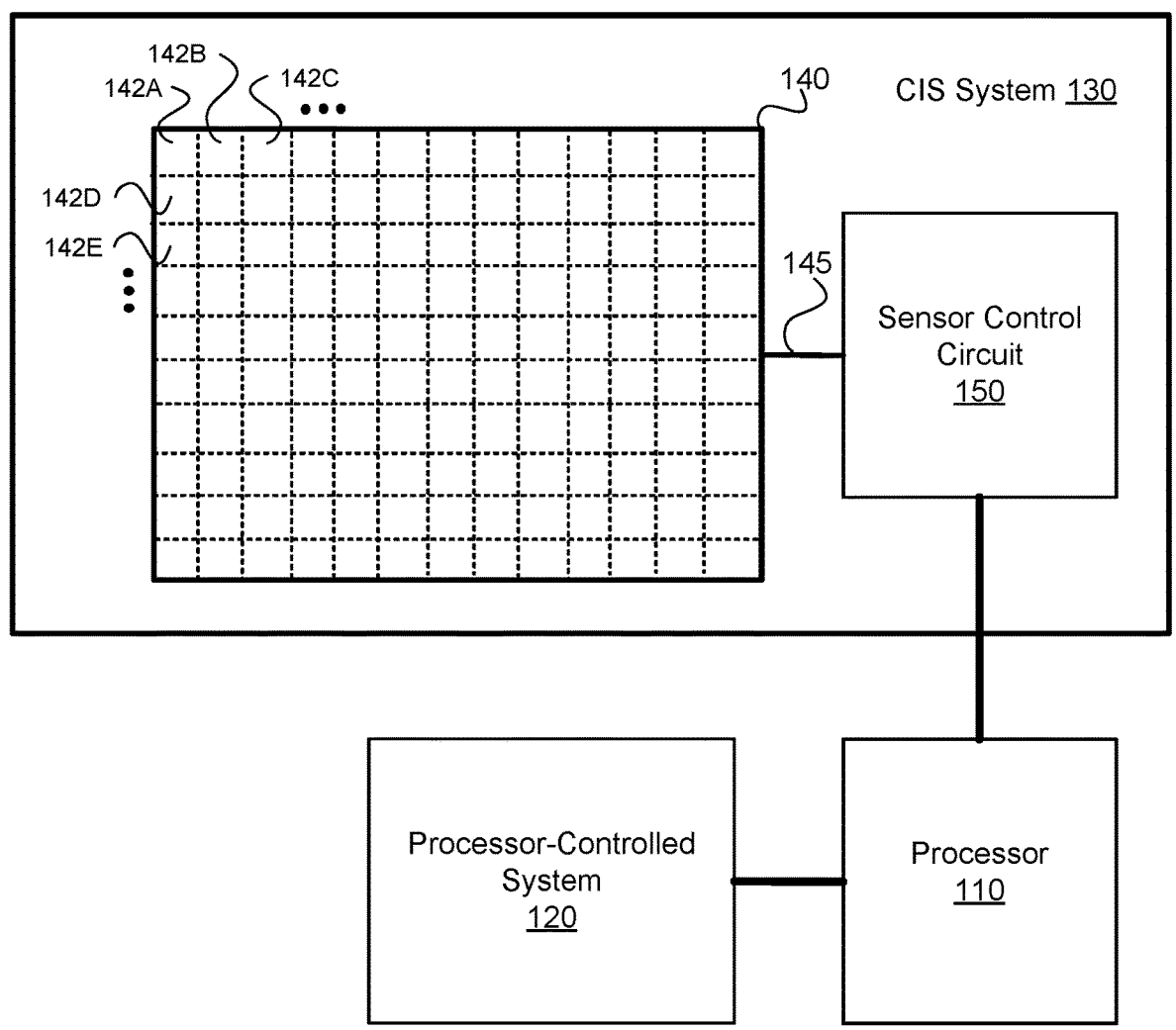
FIG. 1 shows a block diagram of an imaging sensor environment as context for various embodiments described herein.

Turning to FIG. 1, a block diagram is shown of an imaging sensor environment 100 as context for various embodiments described herein. The imaging sensor environment 100 is illustrated as including a processor 110 in communication with a processor-controlled system 120 and a complementary metal-oxide semiconductor (CMOS) imaging sensor (CIS) system 130. The imaging sensor environment 100 may be used to implement a digital imaging system in any suitable application context. For example, the processor 110, processor-controlled system 120, and CIS system 130 can all be implemented in a smartphone, digital camera, wearable device, implantable device, laptop computer, tablet computer, electronic reader, Internet of things (IoT) appliance, or any other suitable context.

The processor-controlled system 120 is intended generally to represent any suitable system or systems to provide any suitable features of the imaging sensor environment 100, other than those of the CIS system 130. For example, in a smart phone, the processor-controlled system 120 can include subsystems for providing telephonic and communications features, display features, user interaction features, application processing features, etc. Embodiments of the imaging sensor environment 100 can include one or more processors 110. In some embodiments, the one or more processors 110 are shared between the processor-controlled system 120 and the CIS system 130. In other embodiments, one or more processors 110 are used by the processor-controlled system 120, and the CIS system 130 has its own one or more dedicated processors 110.

Embodiments of the CIS system 130 include a sensor array 140 and a sensor control circuit 150. As described below, the sensor array 140 and sensor control circuit 150 can communicate via an interface channel 145. A basic function of the sensor array 140 is to capture photons and convert them into electrons using photodetector elements 142. Thus, the sensor array 140 can be implemented as an array of such photodetector elements 142, which can be implemented by any suitable photosensitive component or group of components (e.g., photodiodes). In some cases, the sensor array 140 is a high-pixel-count array, such as a 48 Megapixel array. Generally, designs of modern image sensors with high pixel counts (e.g., 48-Megapixel sensors, or the like) attempt to achieve high frame rates, low read noise, high dynamic range and/or other features with minimal power consumption (e.g., for longer battery life, less heating, etc.). In some implementations, each photodetector element 142 can include a photodiode and a filter that is configured to detect light energy in one or more frequency bands. The photodetector elements 142 can implement a color filter array (CFA), such that the sensor array 140 can detect light energy in at least the range of colors of the visible spectrum and can output corresponding electrical signals.

As described more fully herein, some of the pixels of the sensor array 140 can be configured to facilitate phase detection autofocus (PDAF) features. For example, groups of photodetector elements 142 can be fully or partially covered by micro-lens structures (e.g., on-chip lenses, or OCLs), metal shields, or other disparity-inducing structures. Such disparity-inducing structures cause different photodetector elements 142 in a particular group to receive light from different portions of a main lens that is focusing light onto the sensor array 140. For example, one or more disparity-inducing structures can be applied to a group of four photodetector elements 142 (in a 2-by-2 array) to cause each photodetector element 142 in the group to receive light substantially only from a left or right side of the main lens, from a top or bottom side of the main lens, from a particular quadrant of the main lens, etc.

Though not explicitly shown, the sensor array 140 also includes readout circuitry. In particular, electrons captured by the photodetector elements 142 (by converting photons) are read out by the readout circuitry. As described below, the readout circuitry can generally include readout lines to selectively feed analog output signals from the photodetector elements 142 to analog-to-digital converters (ADCs), which can convert the analog output signals to digital output signals for output over the interface channel 145 to the sensor control circuit 150. In some cases, it is desirable to perform so-called "pixel binning" to essentially group together information from adjacent pixels for combined readout. For example, signals from two adjacent "red" pixels can be combined into a single readout (e.g., fed to a single ADC) to obtain a single digital output value for the combined analog pixel information. One feature of such binning is an increase in signal-to-noise ratio. For example, in low-light conditions, combining multiple adjacent pixels of the same color can yield more signal information. Another feature of such binning is a decrease in readout resources. For example, combining pixels for readout can appreciably reduce the number of readouts and associated readout time; and the readouts can be performed with appreciably fewer ADCs, which can reduce area and power consumption.

The sensor control circuit 150 can include any suitable processors and/or circuits for directing operation of the sensor array 140, processing signals received from the sensor array 140, and interfacing with other systems (e.g., processor 110). Some implementations of the sensor control circuit 150 are implemented as, or include a companion integrated circuit (IC) having integrated interface components, storage components, and processing components. For example, the processing components of the sensor control circuit 150 can include one or more central processing units (CPUs), application-specific integrated circuits (ASICs), application-specific instruction-set processors (ASIPs), graphics processing units (GPUs), physics processing units (PPUs), digital signal processors (DSPs), field-programmable gate array (FPGAs), programmable logic devices (PLDs), controllers, microcontroller units, reduced instruction set computer (RISC) processors, complex instruction set computer (CISC) processors, microprocessors, or the like, or any combination thereof.

As described herein, the CIS system 130 is configured to provide novel autofocus features. Autofocus features are ubiquitous in digital imaging systems, and many such autofocus features are implemented according to either a contrast detection autofocus (CDAF) approach or a PDAF approach. CDAF is based on the principle that higher contrast generally correlates with better focus (e.g., blurry edges in an image can manifest as lower overall contrast in the image). As such, CDAF approaches typically involve an iterative process of measuring contrast, adjusting focal settings, and measuring contrast again, until an optimal focal setting is found (e.g., at which a highest contrast image is formed). For example, an imaging data is obtained by the sensor array 140, and the imaging data can be down-sampled and high-pass filtered to obtain a contrast image indicating contrast levels across the image. The CDAF approach can analyze the contrast image by performing global and local searches of pixels to effectively determine how blurry the image appears to be. In each of a number of subsequent iterations, focal settings can be adjusted, an updated contrast image can be obtained, and the updated contrast image can be reanalyzed to determine whether the image appears to be getting more or less blurry.

While CDAF can produce very sharp focus, it typically has various limitations. One limitation is that the contrast information of any individual iteration does not indicate how out of focus an image is, or in which direction (i.e., which direction of focal adjustment will improve the focus). As such, CDAF may initially adjust focal settings in the wrong direction, initially making the focus worse, before detecting the error and reversing course; and finding a correct focal setting make take many iterations, each time making small setting changes. Further, the contrast information in any particular iteration may not indicate whether an optimal focal setting has been reached. As such, CDAF typically continues to adjust focus until it reaches then passes an optimal focal point, at which point CDAF can determine that the focus is again worsening and can respond by backtracking to the optimal focal setting. For at least these reasons, CDAF can tend to be too slow to work well in many applications, such as tracking of moving objects, focus during video capture, etc. For example, CDAF may consume around 30 frames to settle on optimal focal settings; by that time, many moving objects will have changes position and will again be out of focus. Even with still image capture, users can be frustrated by the picture-taking lag caused by CDAF.

PDAF is based on an entirely different principle than CDAF, and tends to reach an optimal focal setting appreciably faster than CDAF. In general, PDAF works in a way that is similar to human depth perception. Because human eyes are horizontally separated, each eye sees a slightly different image (i.e., each eye is seeing the same scene from a slightly different viewpoint). In particular, when the eyes are both focused on a particular point in space, that point is effectively in the same place in both the left-eye and the right-eye images. However, any points that are closer to, or farther from the eyes will tend to be spatially shifted in one eye's images relative to the other eye's image. The amount and direction of shift mathematically (e.g., geometrically) correlates to the separation between the eyes and the distance of the object from the eyes (e.g., or from the focal distance). The amount and direction of spatial (phase) shift between the two viewpoints is referred to as "disparity."

PDAF exploits this principle by configuring PDAF sensors to capture a same image concurrently from slightly different viewpoints, and to use the data from the different viewpoints to compute disparity measurements. For example, masking and/or lenses are used to configure some sensors for detecting a first viewpoint, and to configure other sensors for concurrently detecting a second viewpoint. Typically, the different viewpoints are configured to be complementary, such as right and left, up and down, etc. Rather than iteratively trying different settings to figure out an optimal amount and direction of focal adjustment as in CDAF, the disparity measurements computed in the PDAF approach directly indicate the amount and direction of focal adjustment to apply for optimal focus.

Figure 2:
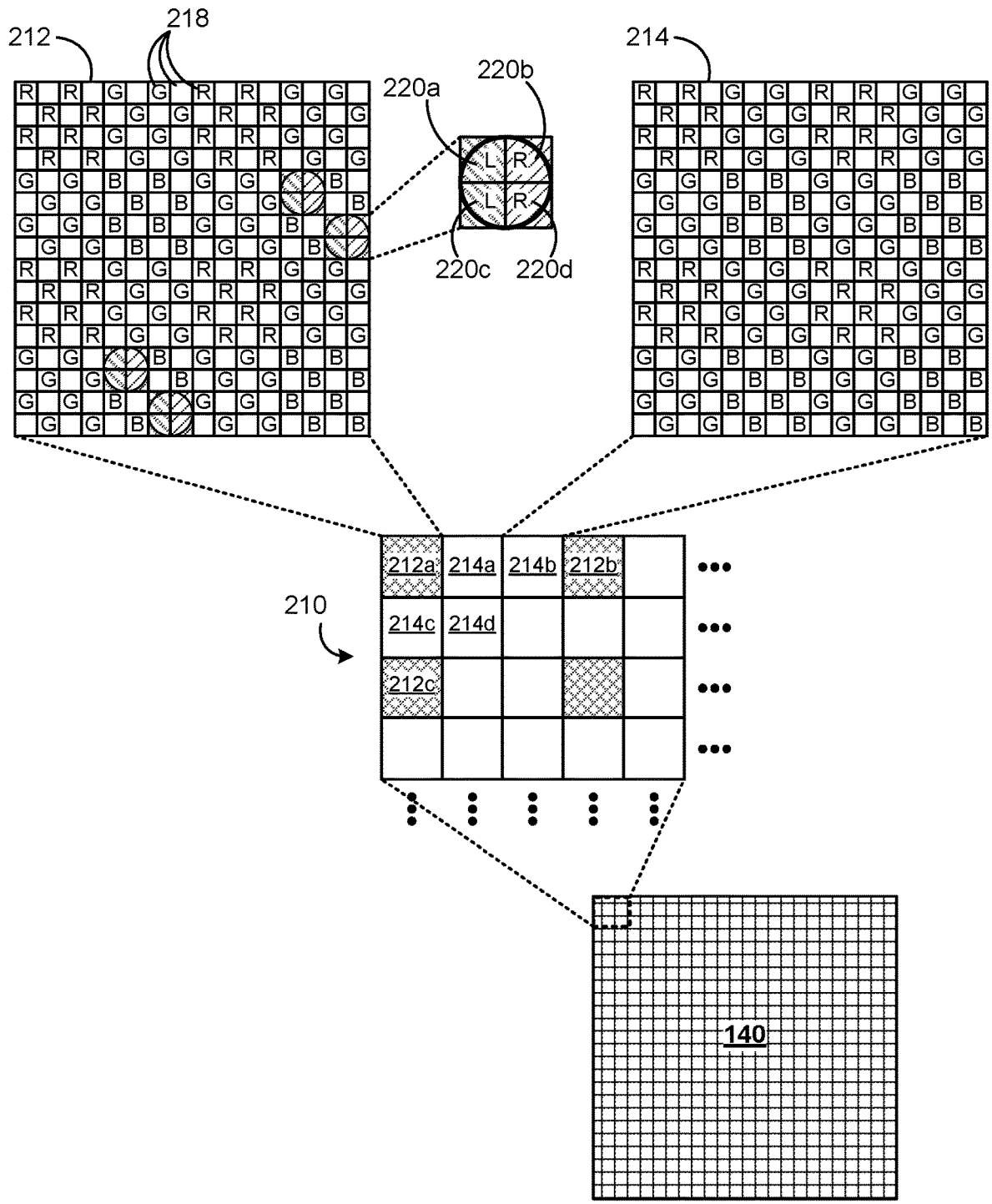
FIG. 2 shows more detailed views of an example implementation of the imaging sensor array configured to support phase detection autofocus (PDAF) features.

FIG. 2 shows more detailed views of an example implementation of the imaging sensor array 140 configured to support PDAF features. As described above, the imaging sensor array 140 includes an array of photodetector elements 142, such as photodiodes. Embodiments of the imaging sensor array 140 arrange the photodetector elements 142 into an array of pixel blocks 210, such that each pixel block 210 is an instance of a N×M photodiode array, where N and M are positive integers. In some implementations, N can be equal to M, such that each pixel block is a square photodiode array. In some implementations, each pixel block 210 has the same number of photodetector elements 142. In some implementations, each pixel block 210 can be generally arranged according to a same color filter array (CFA) pattern (e.g., Bayer pattern, etc.). The photodetector elements 142 configured as part of the CFA for normal imaging (e.g., as opposed to for supporting PDAF) are referred to herein as "imaging pixels" 218.

As described above, groups of adjacent photodetector elements 142 of the imaging sensor array 140 are configured as PDAF pixels 220. Each PDAF pixel 220 is in optical communication with one or more disparity-inducing structures, such as by being fully or partially covered by a micro-lens structure (e.g., an OCL), or a metal shield. Such disparity-inducing structures cause different photodetector elements 142 in a particular group to receive light from different portions of a main lens that is focusing light onto the sensor array 140. In the illustrated implementation, groups of four PDAF pixels 220 are covered by a 2-by-2 OCL, which effectively causes each of the individual PDAF pixels 220 in any particular group to receive light from a respective quadrant of the main lens. The illustrated implementation treats both the top-left and bottom-left quadrants as "left" and treats both the top-right and bottom-right quadrants as "right", such that the group of four PDAF pixels 220 essentially includes two "left" PDAF pixel (PDAF pixels 220a and 220c) and two "right" PDAF pixels (PDAF pixels 220b and 220d). The illustrated configuration is intended only to show one of various configurations of PDAF pixel 220 groups that can be used with novel features described herein. In one alternative implementation, PDAF pixels 220a and 220b are covered by a first 2-by-1 OCL to form a first left-right pair of PDAF pixels 220, and PDAF pixels 220c and 220d are covered by a second 2-by-1 OCL to form a second left-right pair of PDAF pixels 220. In another alternative implementation, PDAF pixels 220a and 220c are covered by a first metal shield (or each by its own metal shield) that covers the right halves of the pixels, and PDAF pixels 220b and 220d are covered by a second metal shield (or each by its own metal shield) that covers the left halves of the pixels.

In some embodiments, each pixel block 210 is configured as a PD block 212 that includes at least one PDAF pixel 220. In other embodiments, only a subset of the pixel blocks 210 are PD blocks 212; and others of the pixel blocks 210 that are not PD blocks 212 are non-PD blocks 214. In the illustrated configuration, one-sixth of the pixel blocks 210 are PD blocks 212, and the remaining five-sixths of the pixel blocks 210 are non-PD blocks 214. Each non-PD block 214 can be arranged according to any suitable CFA pattern, or the like. For example, the illustrated non-PD blocks 214 are each arranged as a 16-by-16 photodetector array (i.e., 256 imaging pixels 218) following a "RGGBW" CFA pattern (red, green, green, blue, white). Some such RGGBW blocks are configured as so-called "HexD-W" blocks, in which the white pixels (also referred to as "luminance pixels") are evenly interspersed with approximately fifty-percent density.

In the illustrated implementation, each PD block 212 is implemented as a non-PD block 214, except that some of the CFA pixels are substituted with PDAF pixels 220. As described below, such implementation consistency can simplify readout structures, binning, and/or other features, as described herein. As described above, PDAF approaches involve computing disparity measurements using data from the PDAF pixels 220. Computing the disparity measurements involves complex computations, including accurate pattern identification and matching between the different viewpoints. Conventionally, the effectiveness of PDAF approaches can relate to the number of PDAF pixel 220 being used to obtain data for different viewpoints. A larger number of PDAF pixels 220 can provide higher data resolution for pattern matching and disparity computations in the different viewpoints, which can tend to provide the PDAF system with more information with which to perform more accurate autofocusing. For example, some conventional PDAF approaches configure around 5-10 percent of the imaging sensor array 140 pixels as PDAF pixels 220, and other conventional approaches have configured up to 100 percent of the imaging sensor array 140 pixels as PDAF pixels 220. While such large numbers of PDAF pixels 220 provide certain features, increasing the number of PDAF pixels 220 can also yield increased hardware costs, increased processing times, decreased imaging resolution, decreased low-light focusing effectiveness, and/or other undesirable consequences. For example, using large numbers of OCLs to form large numbers of PDAF pixels 220 can be relatively expensive and complex to manufacture; alternatively, using large amounts of metal shielding to form large numbers of PDAF pixels 220 can reduce the amount of light reaching the photodetector elements 142 and can reduce imaging quality.

Some implementations can include additional limitations on the practical number of PDAF pixels 220 that can be included in the imaging sensor array 140. Referring back to FIG. 1, the illustrated imaging sensor environment 100 shows the sensor control circuit 150 in communication with the imaging sensor array 140 via an interface channel 145, and the maximum number of conventional PDAF pixels 220 that can be implemented in the sensor array 140 may be limited by the speed and/or bandwidth of the interface channel 145. In one example implementation, the imaging sensor array 140 has tens of millions of photodetector elements 142 (e.g., a 48 Megapixel sensor array), and the imaging sensor array 140 communicates with the companion IC of the sensor control circuit 150 via a relatively low-bandwidth interface channel 145 (e.g., mobile industry processor interface, or MIPI®). In such an implementation, each additional percent of the pixels that is implemented as PDAF pixels 220 can result in hundreds of thousands of additional PDAF pixels 220 outputs being communicated over the interface channel 145.

One approach to addressing the above, and/or other concerns, is to reduce the number of PDAF pixels 220. For example, in the illustrated implementation of FIG. 2, only one-sixth of the pixel blocks 210 of the imaging sensor array 140 are PD blocks 212, and each PD block 212 of FIG. 2 configures only 16 of its 256 photodetector elements 142 as PDAF pixels 220. Thus, in the illustrated implementation, only around one percent of the photodetector elements 142 is a PDAF pixel 220. While implementing such a relatively small percentage of photodetector elements 142 as PDAF pixels 220 can be desirable in terms of cost, manufacturability, data communications, etc.; such an approach still has certain limitations. One limitation is that reducing the percentage of PDAF pixels 220 tends to reduce the resolution of data available for performing PDAF features. As such, any benefits to a further reduction in PDAF pixel 220 count tends to come with a reduction in autofocus quality. Another limitation is that even a relatively small percentage of a very large array is a relatively large number. As such, as imaging sensor array 140 sizes (resolutions) increase, even configuring a relatively small percentage of photodetector elements 142 as PDAF pixels 220 yields a large number of PDAF pixels 220, which produces a lot of PDAF pixel 220 data to readout, a lot of disparity computations to process, etc. For example, a 48-Megapixel imaging sensor array 140 with only around one percent of the pixels configured as PDAF pixels 220 will still generate PDAF data from close to a half-million PDAF pixels 220 for readout and processing.

As noted above with reference to FIG. 1, information from the photodetector element 142 of the imaging sensor array 140 are read out (by readout circuitry) to generate a set of pixel output information corresponding to an image. In some embodiments, it is desirable to use the same readout circuitry (e.g., or at least the same readout architecture) to readout both imaging pixels 218 and PDAF pixels 220. For example, analog information from the pixels is passed to ADCs, which output digital pixel output information.

Figure 3:
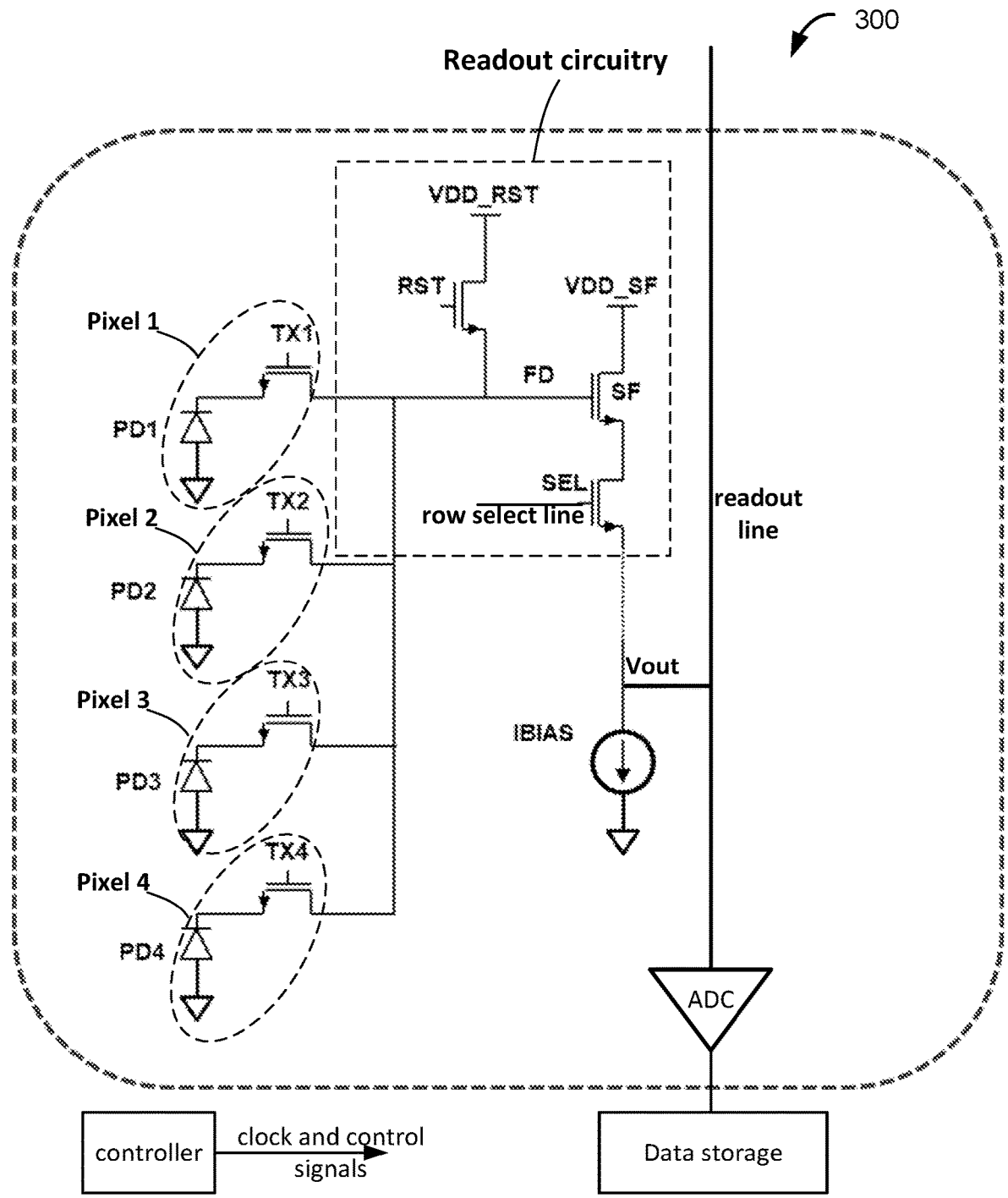
FIG. 3 shows a simplified schematic diagram of a portion of an example image sensor including pixels and readout circuitry that support one or more binning schemes for use with embodiments described herein.

In many applications it is desirable to use pixel binning to group together information from adjacent pixels for combined readout, thereby increasing signal-to-noise ratio (e.g., for improved low-light performance), decreasing readout time (e.g., for improved frame rate), decreasing area and power consumption (e.g., by using fewer ADCs for each readout cycle). etc. As used herein, "binning" refers to so-called charge binning, in which the charges of multiple pixels (e.g., corresponding to the amount of light, number of photons, etc. detected by the pixels) are added, averaged, or otherwise combined onto the readout line at one or multiple levels. For the sake of illustration, FIG. 3 shows a simplified schematic diagram 300 of a portion of an example image sensor including pixels and readout circuitry that support one or more binning schemes for use with embodiments described herein. The partial image sensor can be a partial implementation of the sensor array 140 of FIG. 1. The illustrated portion of the array is shown with four pixels, but the features exemplified by the schematic diagram 300 can be extended to any suitable number of pixels.

Each pixel is illustrated to include a photodiode (PD) (e.g., or any other suitable photosensitive element), and a transfer transistor (TX) coupled to the PD. The TXs of the pixels are all coupled to a floating diffusion node (FD) of readout circuitry. The readout circuitry includes a reset transistor (RST) having a drain node coupled with a reset voltage reference (VDD_RST), a source node coupled with FD (i.e., with the TXs), and a gate node controlled by a reset signal (RST). RST is configured to charge FD to VDD_RST when RST is turned ON, thereby resetting FD. Each PD may be reset along with FD by turning on its corresponding TX (e.g., by asserting or de-asserting a TXn control signal). The readout circuitry also includes a source follower transistor (SF) having a drain node coupled with a source follower voltage reference (VDD_SF), a gate node coupled with FD (i.e., with the TXs), and a source node coupled with a drain node of a row select transistor (SEL). SEL has a gate node coupled to a row select line and a source node coupled with a voltage readout line that provides an analog output pixel signal (Vout) to an ADC for data conversion. The source node of SEL is also coupled to a current source (IBIAS). In the illustrated implementation, TX, RST, SF, and SEL are NMOS transistors. Alternative implementations can be designed using PMOS transistors, and/or other suitable components.

As shown, embodiments can include a controller to generate clock and control signals. The controller can be implemented using any suitable hardware, firmware, etc. In some implementations, the controller is integrated with the sensor array as an on-sensor component (e.g., as part of sensor array 140). In other implementations, the controller is implemented by a separate controller or processor as an off-sensor component (e.g., by the sensor control circuit 150). In other implementations, features of the controller are distributed between one or more on-sensor components and one or more off-sensor components. For example, the sensor control circuit 150 (off-sensor) can generate commands that direct timing and/or generation of particular control signals by an on-sensor controller. In some embodiments, the controller can include processing circuitry, logic state machines, phase locked loops, and/or the like to provide clock and control signals to the image sensor.

Further, embodiments can include data storage configured to store digital data representative of the pixel signals after pixel conversion by the ADC. In some implementations, the data storage includes buffers and/or registers for temporarily storing readout data prior to transmission of the data to other processing components (e.g., prior to transmission to the sensor control circuit 150 over the interface channel 145). For example, readout data is buffered in the data storage for fast, serialized transmission to the sensor control circuit 150.

Figure 4A:
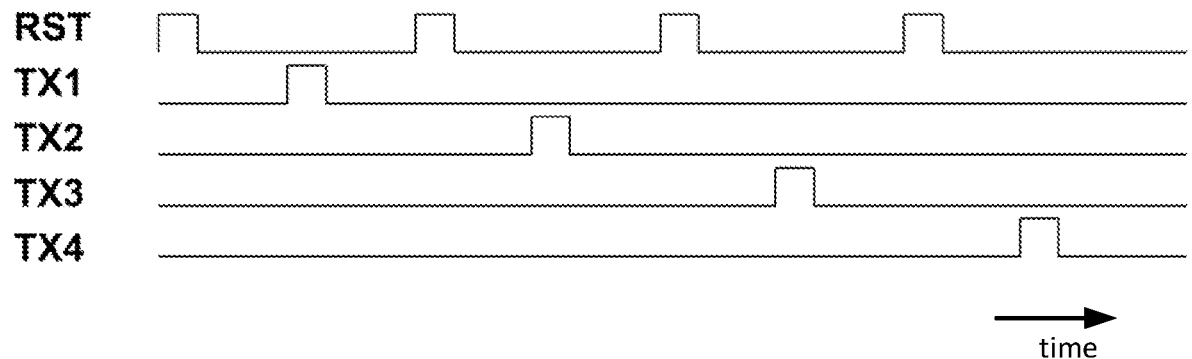
FIGS. 4A-4C show timing diagrams for various unbinned and binned readout schemes.
Figure 4B:
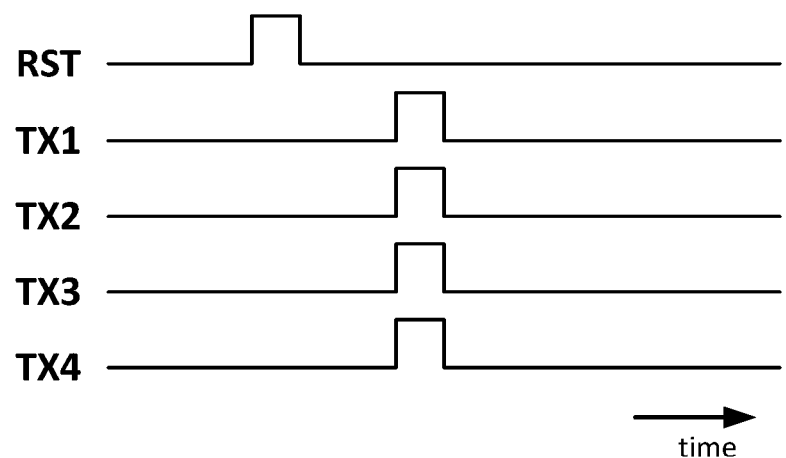
Figure 4C:
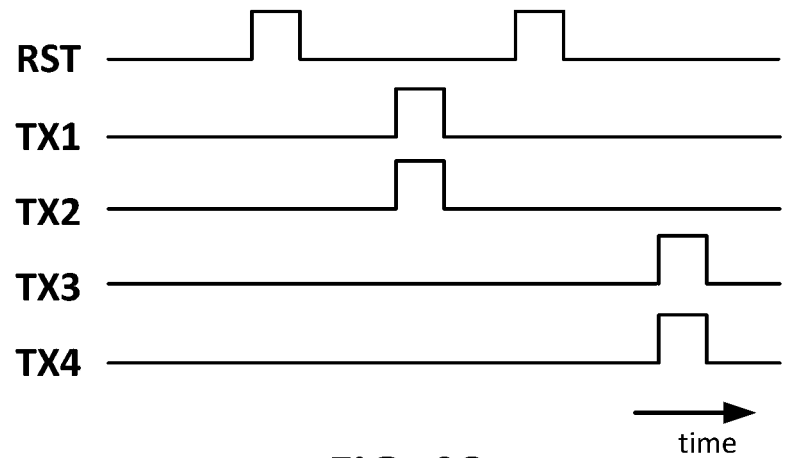

As illustrated, each pixel (e.g., a pixel on each row or each column) has its own TX. TXn control signals can be generated by the controller with particular timing to support different binning schemes. For the sake of illustration, FIGS. 4A-4C show timing diagrams for various un-binned and binned readout schemes. As illustrated by the timing diagram in FIG. 4A, the schematic diagram 300 can be used to implement readout without binning by actuating each TX sequentially with a reset between each actuation to clear the readout circuitry. For example, a RST signal is asserted to turn on the RST transistor, thereby resetting FD to VDD_RST (e.g., zeroing out the charge on the readout circuitry). A single TX (e.g., TX1) is then actuated to turn ON a single PD (e.g., PD1), thereby individually transferring charge from the single PD to FD. The charge on FD is then transferred via SF and SEL to the readout line and to the ADC for data conversion into digital data, which can then be stored in the data storage. Thus, readout of the four pixels consumes four readout cycles, but the individual pixel information from each pixel can be preserved in the initial digital conversion.

Turning to the timing diagram in FIG. 4B, a first binning scheme is represented in which the schematic diagram 300 is used to implement readout with four-way binning. For example, the RST signal is asserted to turn on the RST transistor, thereby resetting FD to VDD_RST (e.g., zeroing out the charge on the readout circuitry). Subsequently, all four TXs (TX1-TX4) are actuated concurrently to turn ON all their respective PDs (PD1-PD4), thereby collectively transferring charge from multiple PDs to FD. The combined charge now on FD is then transferred via SF and SEL to the readout line and to the ADC for data conversion into digital data, which can then be stored in the data storage. Thus, the four pixels are read out in a single readout cycle, but individual pixel information from each pixel is not preserved (i.e., is it combined as part of the readout and initial digital conversion).

Turning to the timing diagram in FIG. 4C, a second binning scheme is represented in which the schematic diagram 300 is used to implement readout with two-way binning. For example, the RST signal is asserted to turn on the RST transistor, thereby resetting FD to VDD_RST (e.g., zeroing out the charge on the readout circuitry). Subsequently, a first pair of TXs (e.g., TX1 and TX2) is actuated concurrently to turn ON their respective PDs (e.g., PD1 and PD2), thereby collectively transferring charge from both PDs to FD. The combined charge now on FD is then transferred via SF and SEL to the readout line and to the ADC for data conversion into digital data, which can then be stored in the data storage. In a next cycle, RST is asserted again to reset the readout circuitry, and a second pair of TXs (e.g., TX3 and TX4) is actuated concurrently to turn ON their respective PDs (e.g., PD3 and PD4), thereby collectively transferring charge from both PDs to FD. The combined charge now on FD is then transferred via SF and SEL to the readout line and to the ADC for data conversion into digital data, which can then be stored in the data storage. Thus, the four pixels are read out in two readout cycles, and pixel information is preserved only at the pixel-pair level (i.e., as information from pairs of pixels is combined as part of the readout and initial digital conversion).

Different binning schemes can be supported, based on which pixels share a common FD, how many pixels share a common FD, capabilities of the controller, etc. In some embodiments, one or more binning schemes can involve multiple levels of binning. For example, a first binning scheme performs charge binning on 32 RGB pixels to generate 16 binned RGB pixel outputs, and a second binning scheme can re-bin the 16 binned RGB pixel outputs to generate four re-binned RGB pixel outputs. While the above descriptions refer to charge binning, embodiments can be implemented with other suitable type of binning, such as digital binning, binning in a later post-processing stage, etc.

Many different CIS systems have been implemented with many different types of CFAs and many different types of binning schemes. For example, in a conventional Bayer pattern CFA, pixels of the same color can be combined before ADC readout; in a conventional quad-Bayer pattern, 2-by-2 pixel clusters can be combined prior to ADC readout; etc. Some binning approaches use "horizontal binning," in which horizontally adjacent (typically same-color) pixels are binned together. Some binning approaches use "vertical binning," in which vertically adjacent (typically same-color) pixels are binned together. Some binning approaches use "diagonal binning," in which diagonally adjacent (typically same-color) pixels are binned together.

Figure 5:
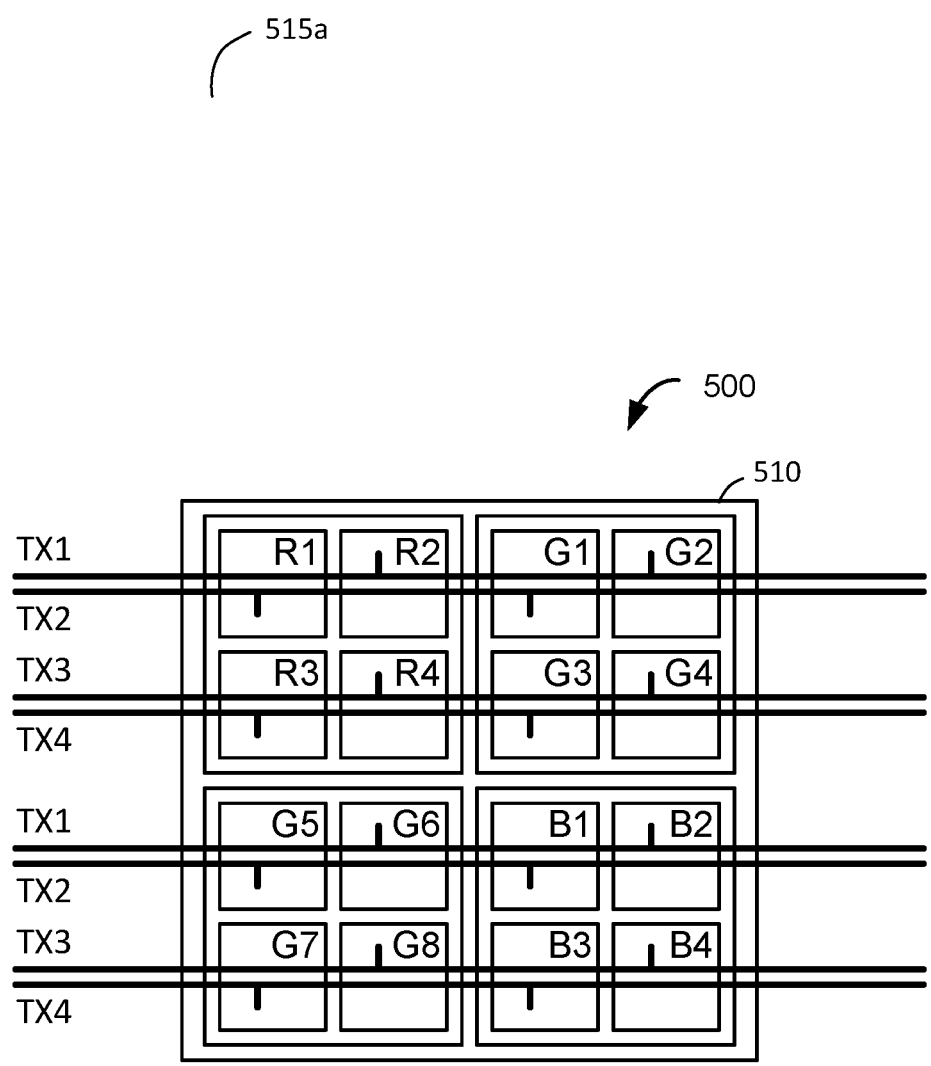
FIG. 5 shows an example of applying such binning schemes to a 4-by-4 pixel block configured according to a standard Bayer RGB color filter array (CFA).

For added clarity, FIG. 5 shows an example of applying such binning schemes to a 4-by-4 pixel block 510 configured according to a standard Bayer RGB CFA. The illustrated pixel block 510 can be one block of a much larger array, such as the sensor array 140 of FIG. 1. For example, the entire CIS may include millions of total pixels implemented as millions of instances of the pixel block 510. One example application, applying the binning scheme described with reference to FIG. 4B, concurrently actuates all of TX1-TX4. This can effectively create binning groups, each with four imaging pixels 218, as follows: R1-R4; G1-G4; G5-G8; and B1-B4. Another example application, applying the binning scheme described with reference to FIG. 4C, concurrently actuates TX1 and TX2, then subsequently concurrently actuates TX3 and TX4. This can effectively create horizontal binning groups, each with two imaging pixels 218, as follows: R1 and R2; R3 and R4; G1 and G2; G3 and G4; G5 and G6; G7 and G8; B1 and B2; and B3 and B4.

Conventionally, pixel binning schemes tend to be used during imaging frames for binning of imaging pixels 218. For example, such pixel binning can permit millions of imaging pixels 218 to be read out with low pixel noise, high frame rate, and/or other features. During PDAF frames, however, conventional CIS systems tend individually to readout the PDAF pixels 220, such as to preserve as much disparity information as possible. It can be seen that complications can arise between imaging pixels 218 and PDAF pixels 220 in binning modes. CIS systems commonly use a row addressing scheme with column parallel read out. That is, as illustrated, control signals are generated which run right to left across the array and determine which pixels are being read out. Generally, the behavior of all the pixels in a row are determined by just a few control signals routed in that pixel row, and it is not practical for select pixels in the row to have a different behavior.

For example, suppose that the B1 and B2 pixels are replaced by pair of PDAF pixels 220 (e.g., covered by a 1-by-2 OCL), such that the B1 imaging pixel 218 becomes a "left" PDAF pixel 220, and the B2 imaging pixel 218 becomes a "right" PDAF pixel 220. The horizontal diagonal binning scheme being consistently applied to all the pixels would bin the two PDAF pixels 220 together. This would effectively merge the left and right information and fail to preserve any of the disparity information used to perform PDAF.

Figure 6:
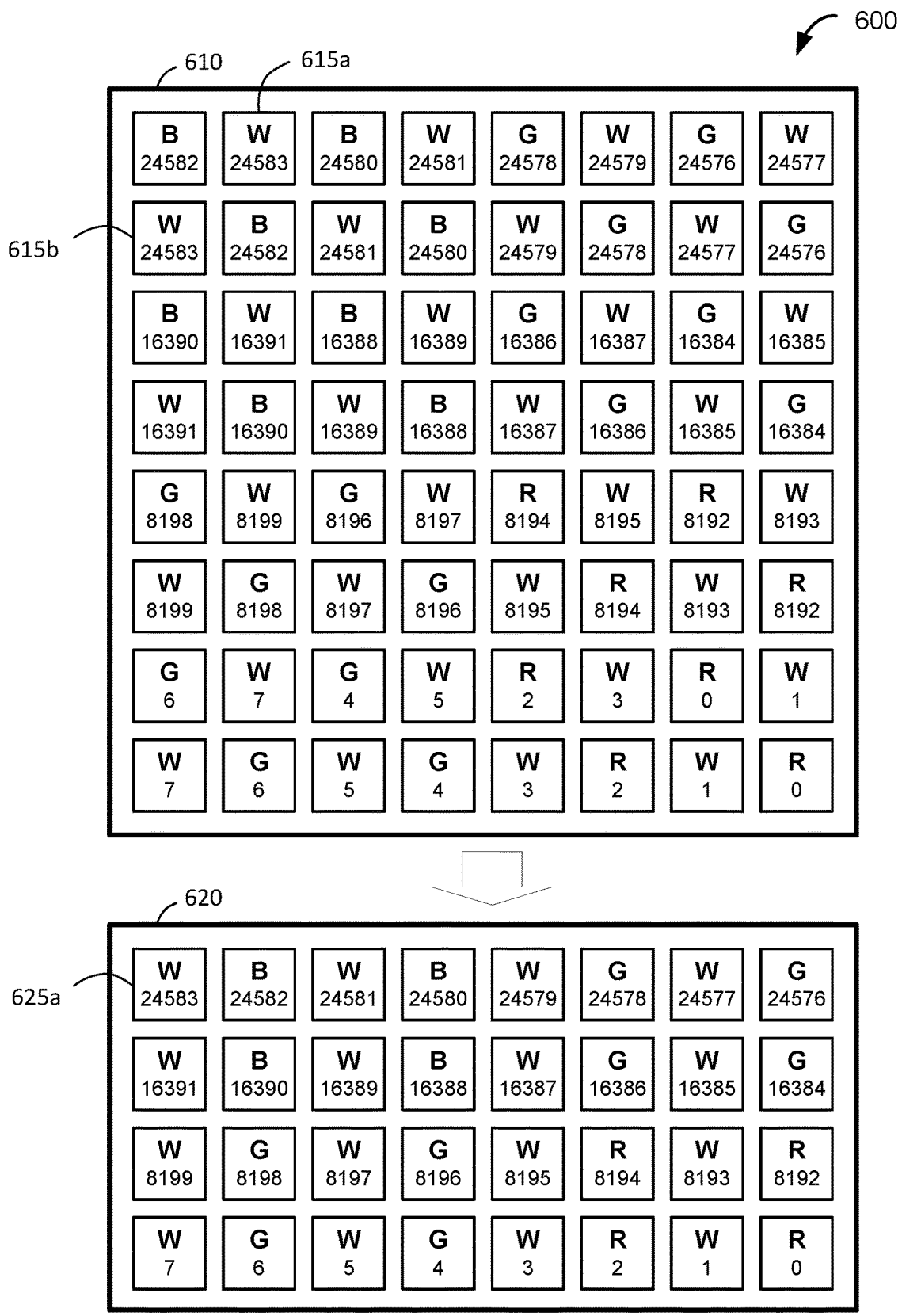
FIG. 6 shows an example of a particular diagonal binning scheme as applied to an 8-by-8 pixel block of photodetector elements configured according to a particular RGBW CFA.

A similar concern can arise in other binning modes for other types of CFAs. For example, FIG. 6 shows an example of a particular diagonal binning scheme 300 as applied to an 8-by-8 pixel block 610 of photodetector elements 142 configured according to a particular RGBW CFA. The illustrated RGBW CFA includes approximately fifty percent W pixels, and approximately fifty percent RGB pixels; each location in the array alternates between an RGB pixel and a W pixel, such that the W pixels are evenly interspersed among the RGB pixels. The illustrated pixel block 610 can be one block of a much larger array, such as the sensor array 140 of FIG. 1. For example, the entire CIS may include millions of total pixels implemented as thousands of instances of the pixel block 610.

In FIG. 6, the pixel block 610 is binned to generate a 4-by-8 down-sampled block 620. Each labeled box in the pixel block 610 represents an un-binned pixel 615. Each labeled box in the down-sampled block 620 represents a binned pixel 625. Each label indicates a color as "R", "G", "B", or "W", representing red, green, blue, or white, respectively. Each label also indicates a binning index. For example, the pixel in the lower-right-most position in the illustrated array is illustrated as "R0", indicating that the pixel is red and is part of a 0th binning group; and the pixel in the upper-left-most position in the illustrated array is illustrated as "B24582", indicating that the pixel is blue and is part of a 24,582nd binning group. The particular binning index numbers shown in FIG. 6 can represent a case where the illustrated pixel block 610 is the lower-right-most block of a much larger array including thousands of such blocks 610.

As illustrated, each un-binned pixel 615 in each row of the pixel block 610 has a different binning index from each other un-binned pixel 615 in the row. For example, the bottom row of the pixel block 610 includes eight un-binned pixels 615 having indexes '0' through '7'. However, each un-binned pixel 615 in each second row of the pixel block 610 shares a binning index with a diagonally adjacent one of the un-binned pixels 615 in the row immediately below. For example, un-binned pixel 615a in the top row (i.e., the eighth row) of the pixel block 610 is a white pixel in the 24,583rd binning group, and diagonally adjacent un-binned pixel 615b in the row immediately below (i.e., the seventh row) of the pixel block 610 is also a white pixel in the 24,583rd binning group. This is intended to represent that binning of the pixels in the pixel block 610 involves combining (e.g., summing, averaging, etc. the charges of) those un-binned pixel 615 having same indexes (e.g., by concurrently turning ON those pixels to pass a combined charge to readout circuitry, such as described with respect to FIG. 3). For example, un-binned pixel 615a is binned with diagonally adjacent un-binned pixel 615b to be read out as a single binned pixel 625a in the down-sampled block 620.

Using the illustrated approach, it can be seen that the binning will essentially result in the same number of columns, and half as many rows. Thus, the binning enables reading out of the entire array with half the number of readout operations. Such a binning approach is generally in the category of "diagonal binning," and can more specifically be referred to as a "1H×2V" binning approach, indicating that the horizontal dimension is divided by '1' (i.e., the array is not down-sampled in the horizontal dimension), and the vertical dimension is divided by '2' (i.e., the array is down-sampled by a factor of two in the vertical dimension).

As in FIG. 5, it can be seen that complications can arise between imaging pixels 218 and PDAF pixels 220 in the illustrated diagonal binning mode. For example, suppose that the two R0 pixels and the two W1 pixels are replaced by a 2-by-2 group of PDAF pixels 220 (e.g., covered by a 2-by-2 OCL), such that the pair of R0 and W1 pixels on the left side of the group are effectively "left" pixels, and the pair of R0 and W1 pixels on the right side of the group are effectively "right" pixels. The diagonal binning scheme being consistently applied across the pixel block 610 would generate two binned pixels 625, each with a combination of the left and right information that fails to preserve any of the PDAF disparity information.

Conventionally, various techniques can be used in CIS systems to preserve PDAF information. One such conventional technique is to perform pixel binning only on rows that do not include any PDAF pixels 220 (i.e., do not perform pixel binning on any rows of pixels that include PDAF pixels 220). Such an approach can preserve disparity information for the PDAF pixels 220, but at the expense of any benefit that would otherwise come from pixel binning of the imaging pixels 218 in those rows. Another such conventional technique is to sequence the pixel read process such that the PDAF pixels 220 are read out individually in a first timeframe, and imaging pixels 218 are read out in a subsequent timeframe with pixel binning. Such an approach can preserve disparity information and can obtain benefits of pixel binning for all imaging pixels 218, but such an approach tends to increase row read time, increase noise, and greatly increase readout complexity. In the above and other conventional approaches, there tends to be a trade-off between performing pixel binning and preserving PDAF disparity information.

Embodiments described herein seek to apply consistent pixel binning across an imaging sensor array 140 to both PDAF pixels 220 and imaging pixels 218 in a manner that preserves PDAF disparity information. Embodiments operate in context of a pixel block that includes an array of photodetector elements 142 that forms part of an imaging sensor array 140, the pixel block including both imaging pixels 218 and groups of PDAF pixels 220. Each group of PDAF pixels 220 is arranged, so that consistently binned parallel (column-parallel or row-parallel) readout across both the imaging pixels 218 and the PDAF pixels 220 preserves PDAF disparity in the group of PDAF pixels 220. In some embodiments, such arrangement involves coupling the PDAF pixels 220 to corresponding pixel actuators in an order that preserves PDAF disparity during the consistently binned parallel readout of the imaging sensor array 140. For example, imaging pixels 218 are coupled with pixel actuators in an order that results in diagonal binning, and the PDAF pixels 220 are coupled with the same pixel actuators in an order that results in vertical binning. In other embodiments, such arrangement involves shielding the PDAF pixels 220 to generate disparity information in a manner that is preserved during the consistently binned parallel readout of the imaging sensor array 140. For example, all pixels (imaging pixels 218 and PDAF pixels 220) of the imaging sensor array 140 are coupled with pixel actuators in an order that results in diagonal binning, and metal shielding is applied in a diagonal fashion to the PDAF pixels 220 so that such diagonal binning preserves horizontal PDAF disparity information.

FIGS. 7-12 show various examples of pixel blocks 710 having both PDAF pixels 220 and imaging pixels 218 configured for disparity-preserving binning, according to various embodiments described herein. The pixel blocks 710 can be part of the imaging sensor array 140 of FIG. 1. For example, the imaging sensor array 140 can be made up of a large number (e.g., thousands) of instances of the pixel block 710. As illustrated in FIGS. 7-12, the pixel blocks 710 include an array of photodetector elements (e.g., photodetector elements 142) including at least one square array 720 of PDAF pixels 220 interspersed with a number of imaging pixels 218. For example, the illustrated pixel blocks 710 include two such square arrays 720, each having four PDAF pixels 220. In other implementations, each pixel block 710 can include only a single square array 720, more than two square arrays 720, larger square arrays, etc.

Each square array 720 includes multiple (e.g., two) first-disparity PDAF pixels 220A and multiple (e.g., two) second-disparity PDAF pixels 220B. Each of the first-disparity PDAF pixels 220A is configured to generate a respective pixel response corresponding to a first disparity orientation, and each of the second-disparity PDAF pixels 220B is configured to generate a respective pixel response corresponding to a second disparity orientation that is complementary to the first disparity orientation. In the illustrated implementation, the first-disparity PDAF pixels 220A can be "left" PDAF pixels (corresponding to receiving light generally coming from a left half of a main imaging lens), and the second-disparity PDAF pixels 220B can be "right" PDAF pixels (corresponding to receiving light generally coming from a right half of a main imaging lens). Alternatively, the first-disparity PDAF pixels 220A can be "up" PDAF pixels (corresponding to receiving light generally coming from an upper half of a main imaging lens), and the second-disparity PDAF pixels 220B can be "down" PDAF pixels (corresponding to receiving light generally coming from a lower half of a main imaging lens); or the first-disparity PDAF pixels 220A and second-disparity PDAF pixels 220B can correspond to any suitable pair of complementary disparity orientations.

As described above, the disparity of the PDAF pixels 220 can result from optical interaction between the PDAF pixels 220 and one or more disparity-inducing structures disposed on top of the PDAF pixels 220. Such disparity-inducing structures can generally include on-chip lenses (e.g., also called micro-lenses) and/or metal shields. For example, square arrays 720 illustrated in FIGS. 7-12 are each a 2-by-2 array. In some embodiments of such a 2-by-2 array of PDAF pixels 220, the disparity-inducing structure is implemented a 2-by-2 on-chip lens (OCL) disposed on top of the 2-by-2 array to cause the first PDAF pixel 220Aa and the third PDAF pixel 220Ab of the 2-by-2 array (i.e., the two first-disparity PDAF pixels 220A) collectively to receive light generally from a first half of a main imaging lens, and to cause a second PDAF pixel 220Ba and a fourth PDAF pixel 220Bb of the 2-by-2 array (i.e., the two second-disparity PDAF pixels 220B) collectively to receive light generally from a second half of the main imaging lens. For example, the OCL is configured so that light generally coming from the left side of the main imaging lens is focused onto the first-disparity PDAF pixels 220A, and light generally coming from the right side of the main imaging lens is focused onto the second-disparity PDAF pixels 220B. In another embodiments of such a 2-by-2 array of PDAF pixels 220, the disparity-inducing structures are implemented by two 2-by-2 OCLs, each disposed on a respective two of the PDAF pixels 220 of the 2-by-2. For example, a first of the 2-by-1 OCLs is disposed on top of the first PDAF pixel 220Aa and the second PDAF pixel 220Ba of the 2-by-2 array to form a first pair of complementary PDAF pixels 220 (e.g., a first pair of "left"-"right" pixels), and a second of the 2-by-1 OCLs is disposed on top of the third PDAF pixel 220Ab and the fourth PDAF pixel 220Bb of the 2-by-2 array to form a second pair of complementary PDAF pixels 220 (e.g., a second pair of "left"-"right" pixels). In another embodiments of such a 2-by-2 array of PDAF pixels 220, the disparity-inducing structures are implemented by metal shields, each disposed on top of a respective PDAF pixel 220 to cover approximately half of the PDAF pixel 220, so that the PDAF pixel 220 effectively receives light only from one side. For example, first and third metal shields cover a right half of each of the first PDAF pixel 220Aa and the third PDAF pixel 220Ab (i.e., the two first-disparity PDAF pixels 220A) causing them collectively to receive light generally from a left half of a main imaging lens, and second and fourth metal shields cover a left half of each of the second PDAF pixel 220Ba and the fourth PDAF pixel 220Bb (i.e., the two second-disparity PDAF pixels 220B) causing them collectively to receive light generally from a right half of the main imaging lens. As used herein, phrases such as "light generally coming from" are not intended to be vague, but rather to convey a practical reality that any type of disparity-inducing structure can generally, but not perfectly, direct light from different portions of the main lens into any particular PDAF pixels 220.

For each of the pixel blocks 710 illustrated in FIGS. 7-12, it is assumed that the various pixels are electrically coupled with pixel actuators. The pixel actuators can include any circuits and/or structures to selectively actuate respectively coupled pixels responsive to control signals. Some embodiments of the pixel actuators are implemented as described with reference to FIGS. 3-5. For example, each pixel actuator includes a transistor, switch, gate, and/or other device, electrically coupled between an output of one or more corresponding pixels and an input to a readout circuit. In an actuated mode, a pixel actuator effectively passes the pixel response of its coupled pixel (e.g., an analog voltage response based on a number of detected photons) to the readout circuit (e.g., for conversion to a digital output signal). Though the pixel actuators are not explicitly shown in FIGS. 7-12, their couplings are indicated by "TX" des-ignators. For example, "TX1" designated in a particular pixel represents that the particular pixel is coupled with a first pixel actuator, so that the first pixel actuator can be used selectively to actuate the particular pixel.

As described above, embodiments operate in context of consistently binned parallel readout of the imaging sensor array 140. One intent of the term "consistently binned parallel readout" is that readout of the pixel blocks 710 of FIGS. 7-12 (e.g., and possibly of the entire imaging sensor array 140) is performed in either a column-parallel, or a row-parallel manner. For example, each pixel actuator is coupled, via a pixel actuation bus, with each of the pixels in a row of the pixel block 710; and column-parallel readout is performed to sequentially readout the row of pixels in a parallel fashion. Alternatively, each pixel actuator is coupled, via a pixel actuation bus, with each of the pixels in a column of the pixel block 710; and row-parallel readout is performed to sequentially readout the column of pixels in a parallel fashion. Another intent of the term "consistently binned parallel readout" is that readout follows a particular binning scheme, and the binning scheme is consistently applied across the pixel blocks 710 (e.g., and possibly across the entire imaging sensor array 140) for both imaging pixels 218 and PDAF pixels 220. For example, if part of the parallel readout involves concurrently actuating a particular set (e.g., a pair) of pixel actuators to cause charge binning to occur, that same set of pixel actuators will be concurrently actuated regardless of whether the readout is of a set of imaging pixels 218 or a set of PDAF pixels 220 (though, as described herein, such a consistent binning scheme can effectively result in diagonal binning for imaging pixels 218 and vertical binning for PDAF pixels 220, or the like, based on the pixel coupling arrangements).

Figure 7:
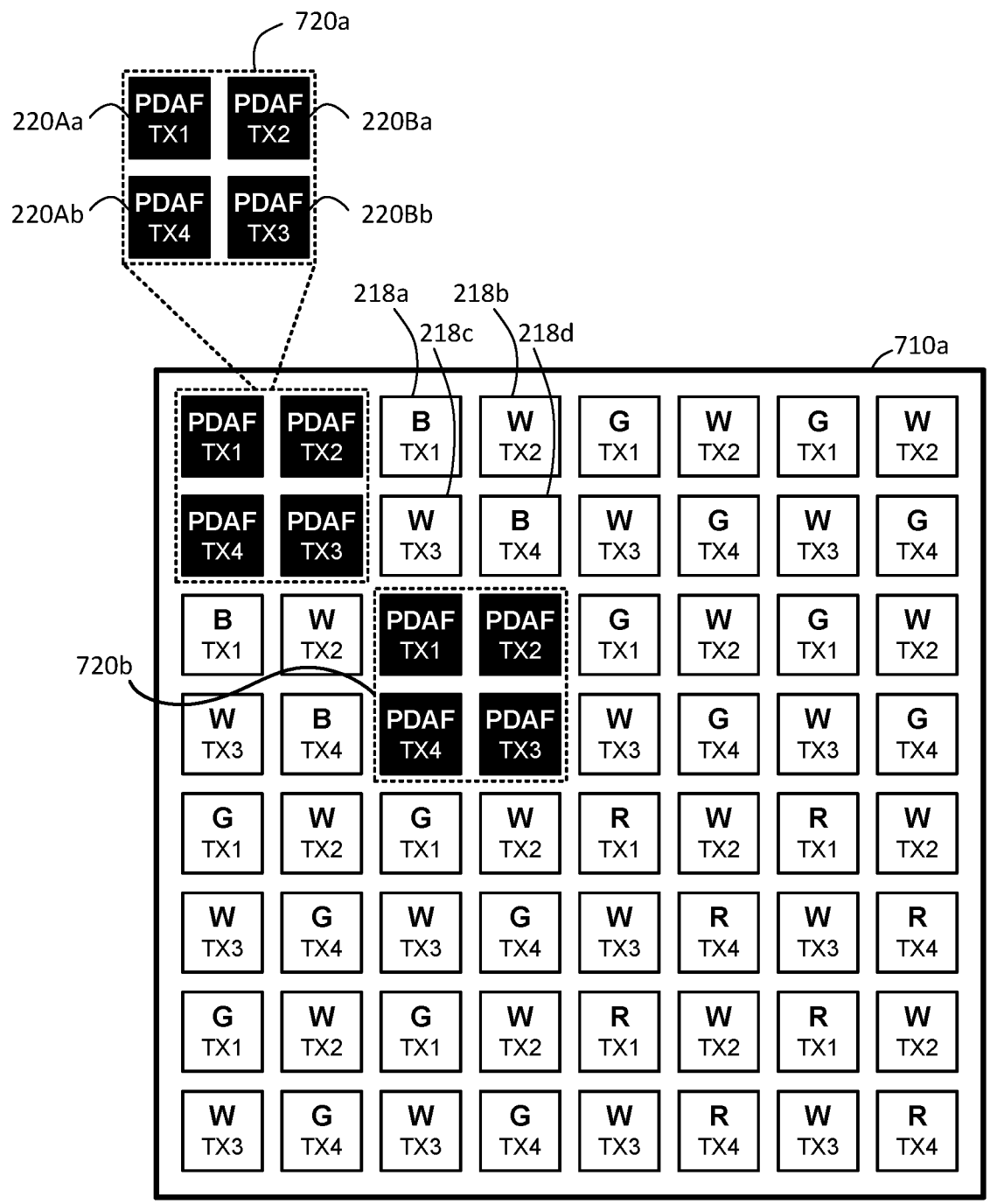
FIG. 7 shows a first example of a pixel block having both PDAF pixels and imaging pixels configured for disparity-preserving binning, according to various embodiments described herein.

Turning specifically to FIG. 7, a first example is shown of a pixel block 710a having both PDAF pixels 220 and imaging pixels 218 configured for disparity-preserving binning, according to various embodiments described herein. The illustrated pixel block 710a includes two square arrays 720, each having a 2-by-2 arrangement of PDAF pixels 220. In particular, each square array 720 includes two first-disparity PDAF pixels 220A and second-disparity PDAF pixels 220B shown as "left" and "right" PDAF pixels 220, respectively, relative to the illustrative orientation of the pixel block 710a. The imaging pixels 218 of the pixel block 710a substantially follow a HexD-W CFA arrangement, for which diagonal binning is desirable. For example, it can be seen that a 2-by-2 block of four imaging pixels 218 adjacent to the first square array 720a includes a first "blue" imaging pixel 218a, a first "white" imaging pixel 218b, a second "blue" imaging pixel 218c, and a second "white" imaging pixel 218d. During binning, it is desirable to diagonally bin together the "blue" pixel information from imaging pixels 218a and 218d, which are diagonally adjacent; and to diagonally bin together the "while" pixel information from imaging pixels 218b and 218c, which are diagonally adjacent. However, it can be seen that, for the PDAF pixels 220, diagonal binning will cause each binning pair to include a first-disparity PDAF pixel 220A and a second-disparity PDAF pixel 220B, thereby losing left-right PDAF disparity information.

Embodiments arrange electrical couplings between the various pixels of each square array 720, so that consistent binning results in diagonal binning of the imaging pixels 218 and vertical binning of the PDAF pixels 220. As illustrated, in each 2-by-2 block of imaging pixels 218, the first (e.g., upper-left) imaging pixel 218a is actuated by a first pixel actuator (TX1), the second (e.g., upper-right) imaging pixel 218*b* is actuated by a second pixel actuator (TX2), the third (e.g., lower-left) imaging pixel 218*c* is actuated by a third pixel actuator (TX3), and the fourth (e.g., lower-right) imaging pixel 218*d* is actuated by a fourth pixel actuator (TX4). In each square array 720 of PDAF pixels 220, a first (e.g., upper-left) PDAF pixel 220 (a first first-disparity PDAF pixel 220Aa) is coupled with the first pixel actuator (TX1), a second (e.g., upper-right) PDAF pixel 220 (a first second-disparity PDAF pixel 220Ba) is coupled with the second pixel actuator (TX2), a third (e.g., lower-left) PDAF pixel 220 (a second first-disparity PDAF pixel 220Ab) is coupled with the fourth pixel actuator (TX4), and a fourth (e.g., lower-right) PDAF pixel 220 (a second second-disparity PDAF pixel 220Bb) is coupled with the third pixel actuator (TX3).

As described with reference to FIGS. 3-5, a controller can use control signals to selectively actuate the pixel actuators, including concurrently to activate multiple pixel actuators. In context of FIG. 7, the controller can selectively actuate the pixel actuators to perform the consistently binned parallel readout of the pixel block 710*a*. At a first time, this can involve concurrently actuating the first and fourth pixel actuators; at a second time, this can involve concurrently actuating the second and third pixel actuators. As described above, a reset can occur between each of those times (e.g., before the first time and again before the second time). The concurrent actuation of the first and fourth pixel actuators causes vertical binning of the first and second first-disparity PDAF pixels 220A in each square array 720 (binning of the "left" disparity information), but causes diagonal binning of the first imaging pixel 218*a* and the fourth imaging pixel 218*d* in each block of imaging pixels 218. Similarly, the concurrent actuation of the second and third pixel actuators causes vertical binning of the first and second second-disparity PDAF pixels 220B in each square array 720 (binning of the "right" disparity information), but causes diagonal binning of the second imaging pixel 218*b* and the third imaging pixel 218*c* in each block of imaging pixels 218.

Figure 8:
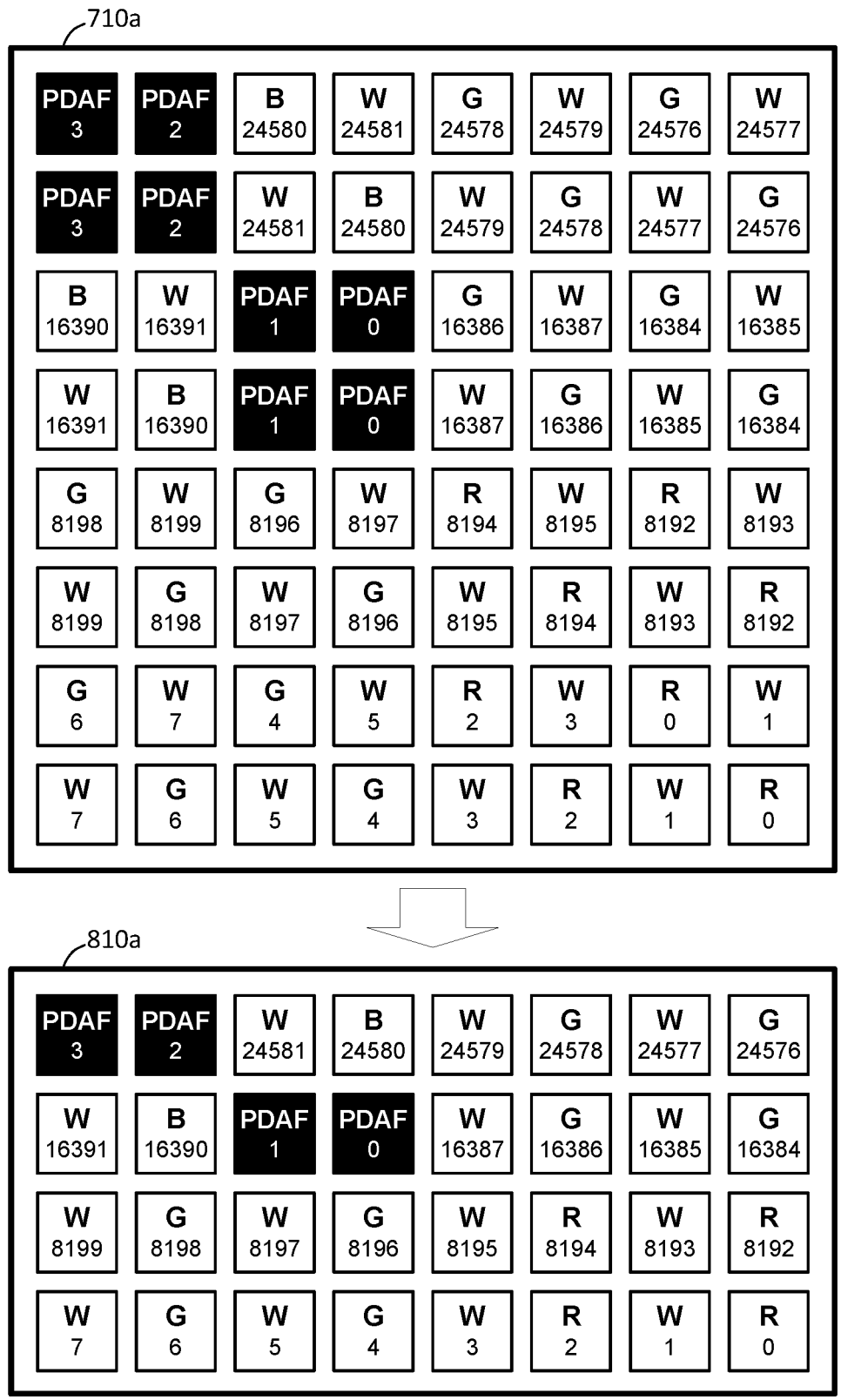
FIG. 8 shows an illustrative output of the consistently binned parallel readout of the pixel block of FIG. 7.

FIG. 8 shows an illustrative output of the consistently binned parallel readout of the pixel block 710*a* of FIG. 7. Similar to the convention of FIG. 6, each pixel in the pixel block 710*a* includes a designation of a pixel type and a binning group. For example, "W 8197" indicates a white (W) imaging pixel 218 in an 8,197th image pixel binning group, and "PDAF 2" indicates a PDAF pixel 220 in a second PDAF pixel binning group. The convention in FIG. 8 assumes that the consistently binned parallel readout begins at the bottom-right of the pixel block 710*a* (which is the bottom-right instance of thousands of instances of the pixel block 710*a* in a large imaging sensor array 140), and proceeds leftward then upward.

As described with reference to FIG. 7, the pixels are coupled with the pixel actuators in such a way that concurrent actuation of the pixel actuators causes vertical binning of PDAF pixels 220, but diagonal binning of imaging pixels 218. The result of such consistently binned parallel readout is illustrated by the binned pixel block 810*a* of FIG. 8. For example, applying a particular concurrent actuation of pixel actuators causes two diagonally adjacent "G 16386" pixels in the pixel block 710*a* to diagonally bin to produce a single "G 16386" binned pixel output in the binned pixel block 810*a*; and applying the same concurrent actuation of pixel actuators causes two vertically adjacent "PDAF 0" pixels in the pixel block 710*a* to vertically bin to produce a single "PDAF 0" binned pixel output in the binned pixel block 810*a*. Similarly, applying a particular concurrent actuation of pixel actuators causes two diagonally adjacent "W 16387" pixels in the pixel block 710*a* to diagonally bin to produce a single "W 16387" binned pixel output in the binned pixel block 810*a*; and applying the same concurrent actuation of pixel actuators causes two vertically adjacent "PDAF 1" pixels in the pixel block 710*a* to vertically bin to produce a single "PDAF 1" binned pixel output in the binned pixel block 810*a*.

Figure 9:
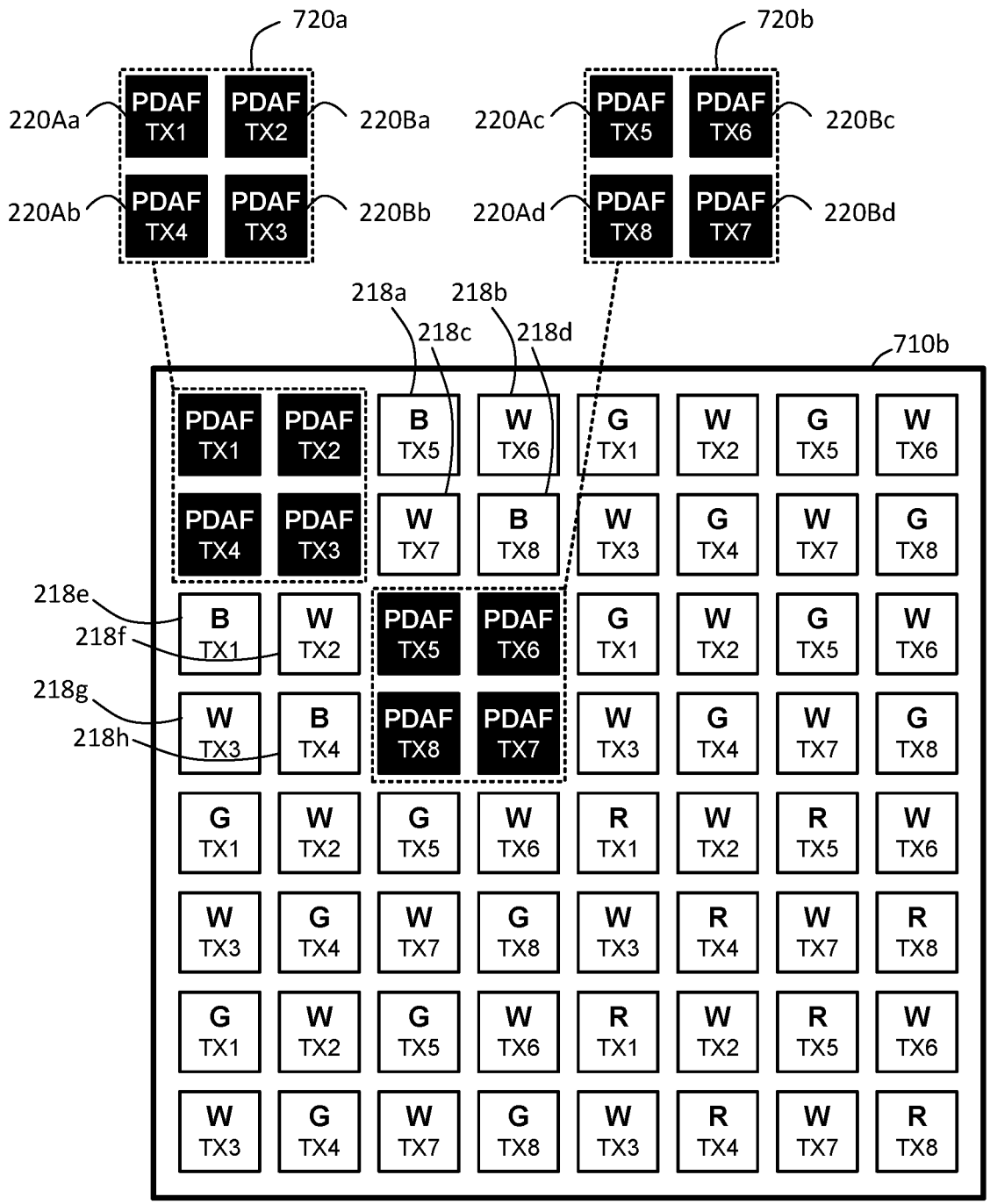
FIG. 9 shows a second example of a pixel block having both PDAF pixels and imaging pixels configured for disparity-preserving binning, according to various embodiments described herein.

The embodiments illustrated in FIGS. 7 and 8 assume four pixel actuators are used to perform consistently binned parallel readout of the pixel block 710. Other embodiments can use different numbers of pixel actuators. For example, FIG. 9 shows a second example of a pixel block 710*b* having both PDAF pixels 220 and imaging pixels 218 configured for disparity-preserving binning, according to various embodiments described herein. For added clarity, the pixel arrangement of the pixel block 710*b* of FIG. 9 is illustrated to be identical to that of the pixel block 710*a* of FIG. 7, however some electrical couplings between the pixels and the pixel actuators are different. In particular, the embodiments illustrated by FIG. 9 assume eight pixel actuators are used for consistently binned parallel readout of the pixel block 710*b*. Still, embodiments arrange electrical couplings between the various pixels of each square array 720, so that consistent binning results in diagonal binning of the imaging pixels 218 and vertical binning of the PDAF pixels 220.

As illustrated, the eight pixel actuators (TX1-TX8) are coupled, according to a particular arrangement, with pairs of 2-by-2 blocks of pixels. Each pair of 2-by-2 blocks of imaging pixels 218 can be arranged as follows: a first (e.g., upper-left of first 2-by-2 block) imaging pixel 218*a* is actuated by a fifth pixel actuator (TX5), a second (e.g., upper-right of first 2-by-2 block) imaging pixel 218*b* is actuated by a sixth pixel actuator (TX6), a third (e.g., lower-left of first 2-by-2 block) imaging pixel 218*c* is actuated by a seventh pixel actuator (TX7), a fourth (e.g., lower-right of first 2-by-2 block) imaging pixel 218*d* is actuated by a eighth pixel actuator (TX8), a fifth (e.g., upper-left of second 2-by-2 block) imaging pixel 218*e* is actuated by a first pixel actuator (TX1), a sixth (e.g., upper-right of second 2-by-2 block) imaging pixel 218*f* is actuated by a second pixel actuator (TX2), a seventh (e.g., lower-left of second 2-by-2 block) imaging pixel 218*g* is actuated by a third pixel actuator (TX3), and a eighth (e.g., lower-right of second 2-by-2 block) imaging pixel 218*h* is actuated by a fourth pixel actuator (TX4). Each pair of square arrays 720 of PDAF pixels 220 can be arranged as follows: a first (e.g., upper-left of first square array 720*a*) PDAF pixel 220 (a first first-disparity PDAF pixel 220Aa) is coupled with the first pixel actuator (TX1), a second (e.g., upper-right of first square array 720*a*) PDAF pixel 220 (a first second-disparity PDAF pixel 220Ba) is coupled with the second pixel actuator (TX2), a third (e.g., lower-left of first square array 720*a*) PDAF pixel 220 (a second first-disparity PDAF pixel 220Ab) is coupled with the fourth pixel actuator (TX4), a fourth (e.g., lower-right of first square array 720*a*) PDAF pixel 220 (a second second-disparity PDAF pixel 220Bb) is coupled with the third pixel actuator (TX3), a fifth (e.g., upper-left of second square array 720*b*) PDAF pixel 220 (a third first-disparity PDAF pixel 220Aa) is coupled with the fifth pixel actuator (TX5), a sixth (e.g., upper-right of second square array 720*b*) PDAF pixel 220 (a third second-disparity PDAF pixel 220Ba) is coupled with the sixth pixel actuator (TX6), a seventh (e.g., lower-left of second square array 720*b*) PDAF pixel 220 (a fourth first-disparity PDAF pixel 220Ab) is coupled with the eighth pixel actuator (TX8), and a eighth (e.g., lower-right of second square array 720*b*) PDAF pixel 220 (a fourth second-disparity PDAF pixel 220Bb) is coupled with the seventh pixel actuator (TX7).

As described above, the controller can selectively actuate the pixel actuators to perform the consistently binned parallel readout of the pixel block 710*b*. At a first time, this can involve concurrently actuating the first, fourth, fifth, and eighth pixel actuators; at a second time, this can involve concurrently actuating the second, third, sixth, and seventh pixel actuators. As described above, a reset can occur between each of those times (e.g., before the first time and again before the second time). The concurrent actuation of the first, fourth, fifth, and eighth pixel actuators causes vertical binning of the four first-disparity PDAF pixels 220A in the pair of square arrays 720 (binning of the "left" disparity information), but causes diagonal binning of imaging pixels 218*a*, 218*d*, 218*e*, and 218*h* in each pair of 2-by-2 blocks of imaging pixels 218. Similarly, the concurrent actuation of the second, third, sixth, and seventh pixel actuators causes vertical binning of the four second-disparity PDAF pixels 220B in the pair of square arrays 720 (binning of the "right" disparity information), but causes diagonal binning of imaging pixels 218*b*, 218*c*, 218*f*, and 218*g* in each pair of 2-by-2 blocks of imaging pixels 218.

Figure 10:
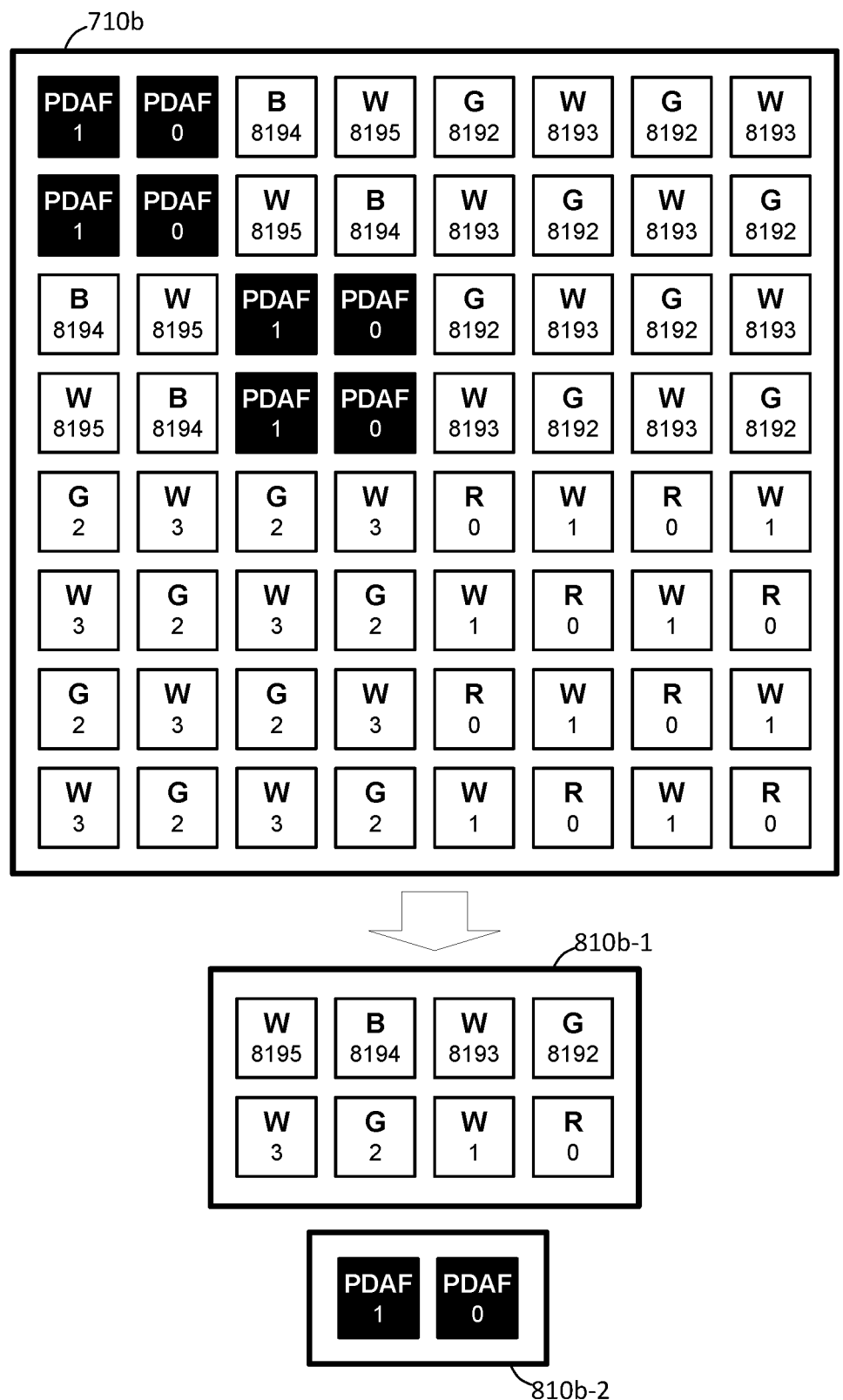
FIG. 10 shows an illustrative output of the consistently binned parallel readout of the pixel block of FIG. 9.

FIG. 10 shows an illustrative output of the consistently binned parallel readout of the pixel block 710*b* of FIG. 9. Similar to the convention of FIG. 8, each pixel in the pixel block 710*b* includes a designation of a pixel type and a binning group. By using eight pixel actuators to bin pairs of 2-by-2 blocks of pixels (rather than four pixel actuators being used to bin single s-by-2 blocks of pixels, as in FIGS. 7 and 8), there can be many fewer binning groups, and the resulting binning is more aggressive. As described with reference to FIG. 9, the pixels are coupled with the pixel actuators in such a way that concurrent actuation of the pixel actuators causes vertical binning of PDAF pixels 220, but diagonal binning of imaging pixels 218. The result of such consistently binned parallel readout is illustrated by the binned pixel block 810*b* of FIG. 10. The binned pixel block 810*b* is shown as a first binned pixel block 810*b*-1 with only the binned outputs of the imaging pixels 218 and a second binned pixel block 810*b*-2 with only the binned outputs of the PDAF pixels 220. In practice, these separate blocks can be output as parts of a single binned pixel block 810*b* (e.g., to be stored as a single set of output data), or as separate outputs (e.g., to store the binned imaging data separately from storing the binned PDAF data).

In the illustrated example, applying a particular concurrent actuation of pixel actuators causes four "B 8194" pixels in the pixel block 710*b* to diagonally bin to produce a single "B 8194" binned pixel output in the binned pixel block 810*b*-1; and applying the same concurrent actuation of pixel actuators causes four "PDAF 0" pixels in the pixel block 710*b* to vertically bin to produce a single "PDAF 0" binned pixel output in the binned pixel block 810*b*-2. Similarly, applying a particular concurrent actuation of pixel actuators causes four "W 8195" pixels in the pixel block 710*b* to diagonally bin to produce a single "W 8195" binned pixel output in the binned pixel block 810*b*-1; and applying the same concurrent actuation of pixel actuators causes four "PDAF 1" pixels in the pixel block 710*b* to vertically bin to produce a single "PDAF 1" binned pixel output in the binned pixel block 810*b*-2.

Binning of 4-by-4 blocks, such as in FIGS. 9 and 10, can be implemented in various ways. One approach is to split the 4-by-4 block into four 2-by-2 sub-blocks. Each 2-by-2 sub-block can be implemented substantially according to the schematic diagram 300 of FIG. 3 with its own respective readout circuitry, such that each sub-block has its own source-follower output path through a respective select transistor. The source-follower output paths can be shorted together into a common analog-to-digital converter (ADC) block. In one such implementation, each of the four PDs in two of the sub-blocks are coupled with a respective one of four transfer transistors (e.g., TX1-TX4), and each of the four PDs in the other two of the sub-blocks are coupled with a respective one of a different four transfer transistors (TX5-TX8). For example, as illustrated in FIG. 9, TX1, TX4, TX5 and TX8 can be concurrently actuated in a particular readout cycle to produce a binned output from PDAF pixels 220Aa, 220Ab, 220Ac, and 220Ad (i.e., the four "left" PDAF pixels 220).

In another such implementation, each of the four PDs in all four of the sub-blocks are coupled with a respective one of four transfer transistors (e.g., TX1-TX4). For example, each illustrated pair of TXs in FIG. 9 can be combined into a single TX, such that TX1 and TX5 become only TX1, TX2 and TX6 become only TX2, TX3 and TX7 become only TX3, and TX4 and TX8 become only TX4 (e.g., the actuators labeled TX1 and TX5 are actuated by a single signal, the actuators are shorted together, etc.). In such an implementation, when any particular TX is actuated, the coupled PD from each of the four sub-blocks (i.e., four PDs) are concurrently selected for readout. For example, applying such a modification to FIG. 9, it can be seen that concurrently actuating TX1 and TX4 in a particular readout cycle produces a binned output from PDAF pixels 220Aa, 220Ab, 220Ac, and 220Ad (i.e., the four "left" PDAF pixels 220).

Figure 14A:
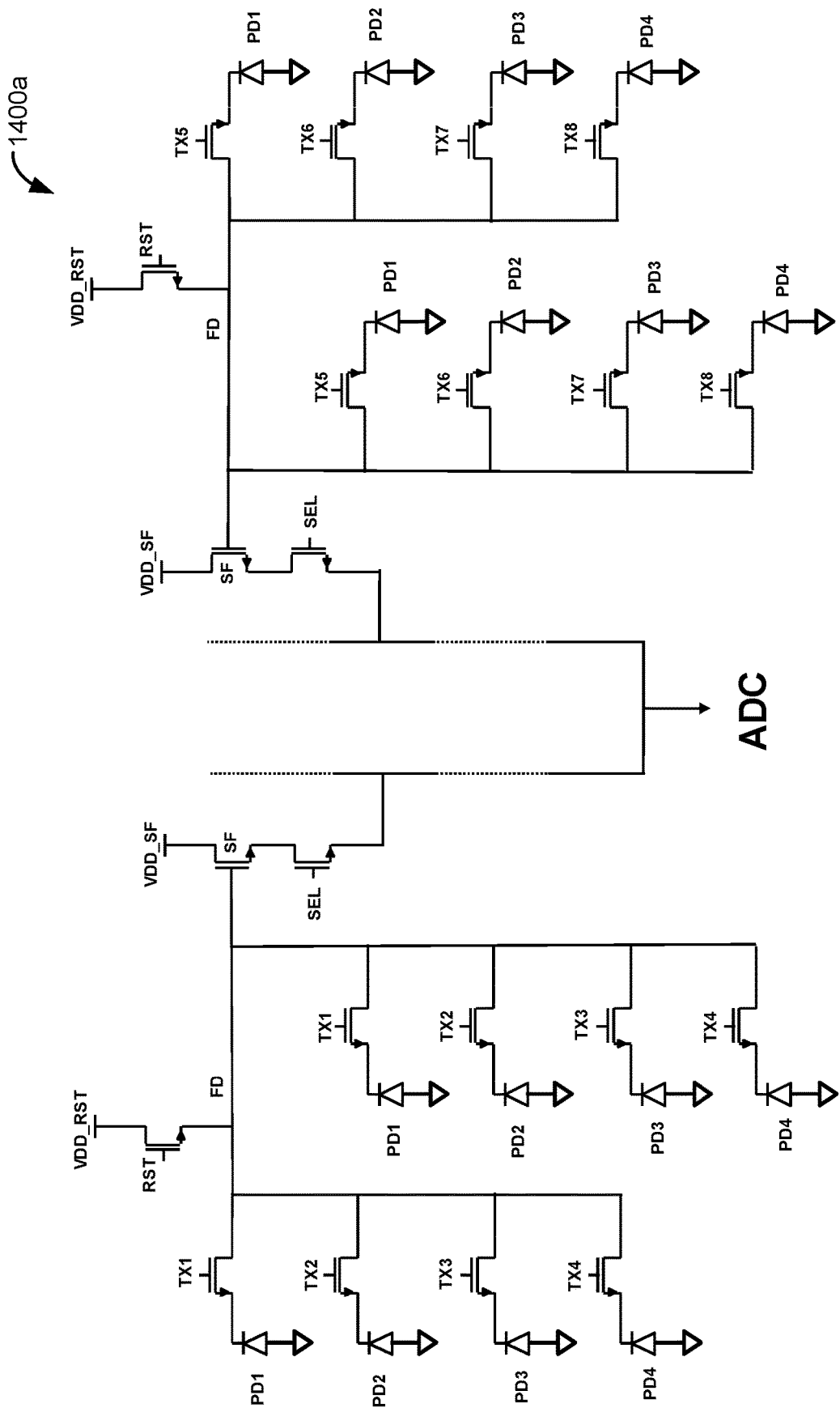
FIGS. 14A and 14B show simplified schematic diagrams of a portion of an example image sensor including pixels and readout circuitry to illustrate various approaches to binning 4-by-4 pixel blocks.
Figure 14B:
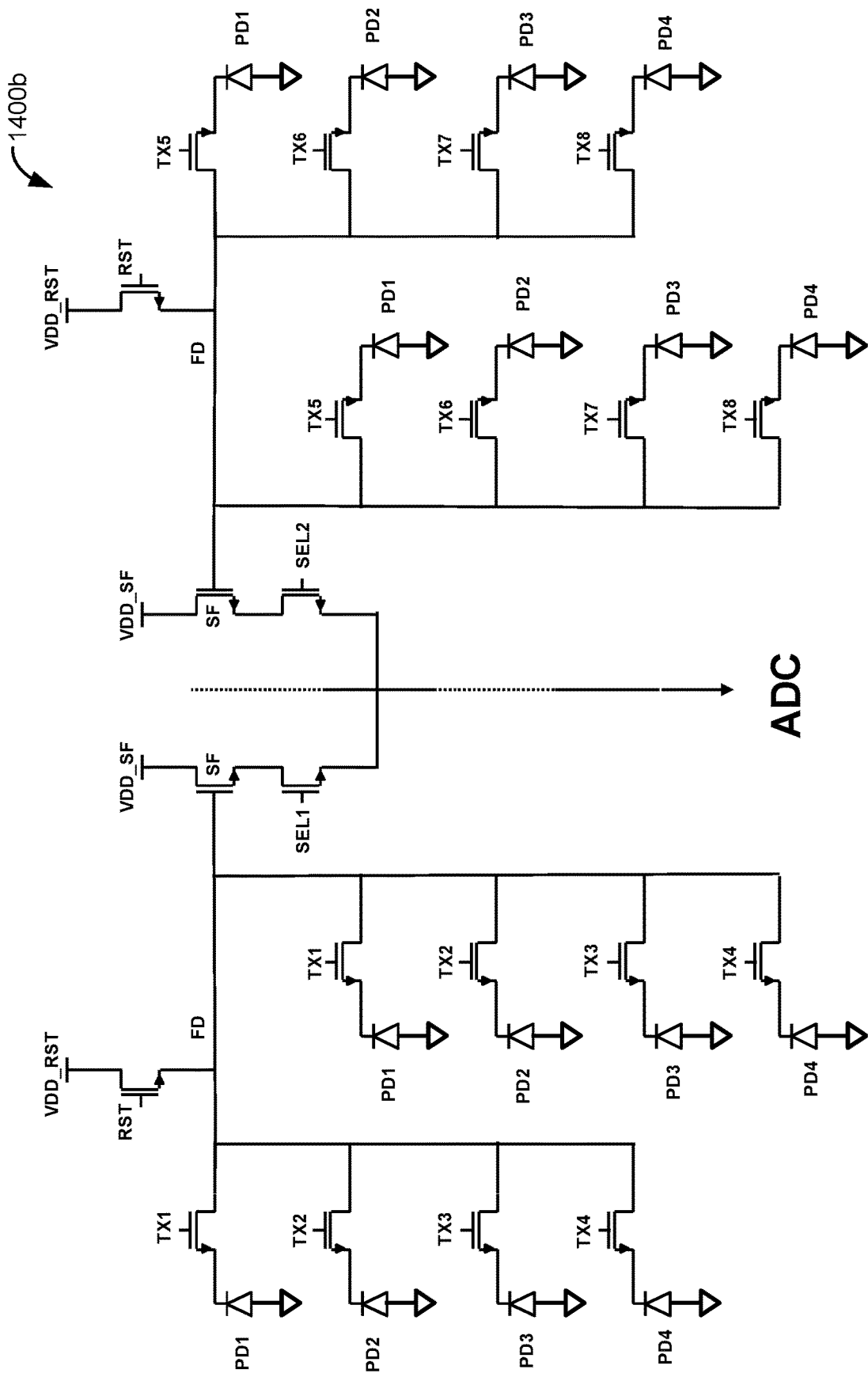

FIGS. 14A and 14B shows simplified schematic diagrams 1400 of a portion of an example image sensor including pixels and readout circuitry to illustrate two additional approaches to binning 4-by-4 pixel blocks, such as those in FIGS. 9 and 10. For added clarity, the schematic diagrams 1400 are illustrated in a similar manner to those illustrated in and described with reference to FIG. 3, except as modified for binning of a 4-by-4 pixel block. FIG. 14A shows a first implementation in which the 4-by-4 pixel block is split into two 2-by-4 sub-blocks. Each 2-by-4 sub-block is coupled with a respective readout structure to output a partially binned result via a respective source-follower path onto a respective voltage readout line (to provide a respective analog output pixel signal (Vout). Each of four pairs of PDs in the first sub-block is coupled with a respective one of a first set of four transfer transistors (e.g., TX1-TX4), and each of four pairs of PDs in the second sub-block is coupled with a respective one of a second set of four transfer transistors (TX5-TX8). The two source-follower paths both can be selected by a common select signal (i.e., a single signal selects the output from both sub-blocks). The respective analog output pixel signals (Vouts) from the respective voltage readout lines can be fed into a single analog-to-digital converter (ADC) block.

Figure 11:
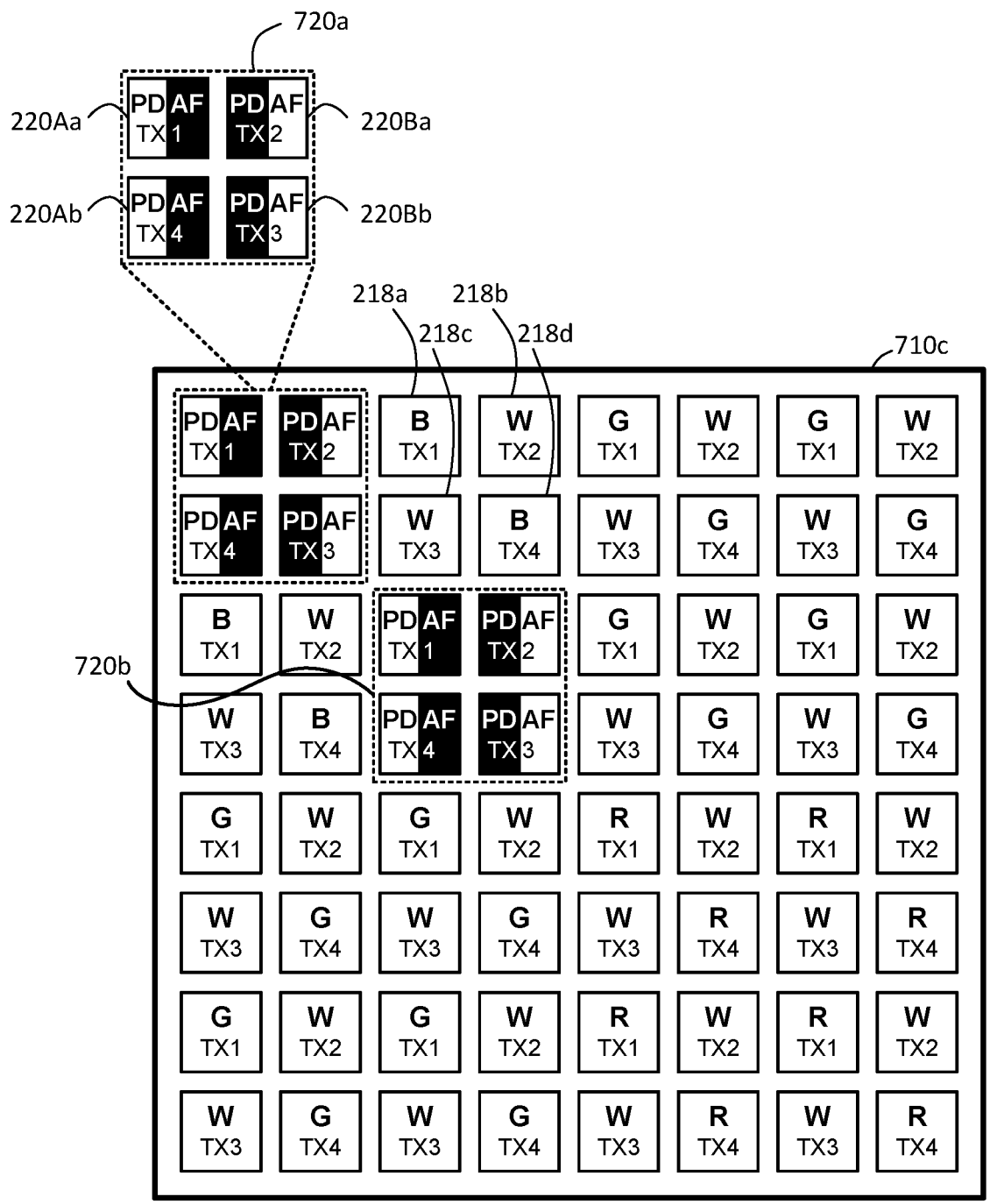
FIG. 11 shows a third example of a pixel block having both PDAF pixels and imaging pixels configured for disparity-preserving binning, according to various embodiments described herein.

FIG. 14B shows a second implementation in which the 4-by-4 pixel block is split into two 2-by-4 sub-blocks. As in FIG. 14A, each 2-by-4 sub-block is coupled with a respective readout structure to output a partially binned result via a respective source-follower path. Each of four pairs of PDs in the first sub-block is coupled with a respective one of a first set of four transfer transistors (e.g., TX1-TX4), and each of four pairs of PDs in the second sub-block is coupled with a respective one of a second set of four transfer transistors (TX5-TX8). Unlike in FIG. 14A, each of the two source-follower paths in FIG. 14B is selected by its own respective select signal, and the respective analog output pixel signals (Vouts) from the two sub-block are output to a shared voltage readout line coupled with the ADC block. [0080] As described above, the PDAF pixels 220 can be configured to generate disparity information by using any suitable disparity-inducing structures. For example, the embodiments of FIGS. 7-10 can be produced using OCLs, metal shields, etc. FIG. 11 shows a third example of a pixel block 710c having both PDAF pixels 220 and imaging pixels 218 configured for disparity-preserving binning, according to various embodiments described herein. The pixel block 710c can be an implementation of the pixel block 710a of FIG. 7 explicitly using metal shields. In the illustrated example, each first-disparity PDAF pixel 220A has a right half covered by a metal shield, such that the first-disparity PDAF pixels 220A receive light generally from a left half of a main imaging lens; and each second-disparity PDAF pixel 220B has a left half covered by a metal shield, such that the second-disparity PDAF pixels 220B receive light generally from a right half of a main imaging lens.

Figure 12:
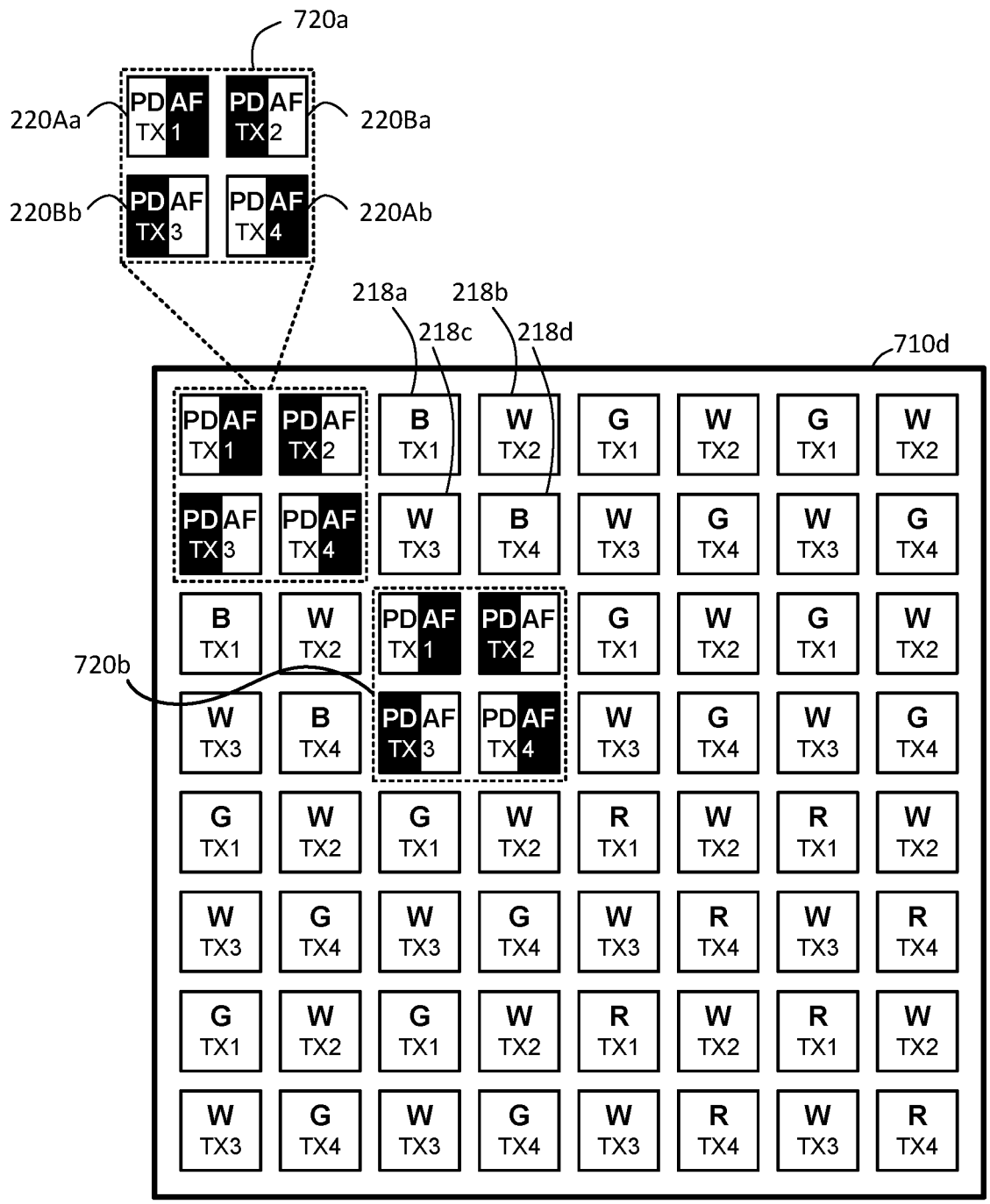
FIG. 12 shows a fourth example of a pixel block having both PDAF pixels and imaging pixels configured for disparity-preserving binning, according to various embodiments described herein.

The examples described with reference to FIGS. 7-11 electrically couple pixels of the pixel blocks 710 with the pixel actuators, in such a way that concurrent actuation of the pixel actuators causes vertical binning of PDAF pixels 220, but diagonal binning of imaging pixels 218. In other embodiments, disparity-inducing structures can be arranged so that diagonal binning of the PDAF pixels 220 is also disparity-preserving. FIG. 12 shows a fourth example of a pixel block 710d having both PDAF pixels 220 and imaging pixels 218 configured for disparity-preserving binning, according to various embodiments described herein. The illustrated pixel block 710d includes two square arrays 720, each having a 2-by-2 arrangement of PDAF pixels 220. In particular, each square array 720 includes two first-disparity PDAF pixels 220A and second-disparity PDAF pixels 220B shown as "left" and "right" PDAF pixels 220, respectively, relative to the illustrative orientation of the pixel block 710d. For added clarity, the pixel block 710d is illustrated to be identical to the pixel block 710a of FIG. 7, except that metal shielding is used to configure the PDAF pixels 220 so that same-disparity PDAF pixels 220 are diagonally adjacent.

Embodiments arrange electrical couplings between the various pixels of each square array 720, so that consistent binning results in diagonal binning of the imaging pixels 218 and diagonal binning of the PDAF pixels 220. As illustrated, in each 2-by-2 block of imaging pixels 218, the first (e.g., upper-left) imaging pixel 218a is actuated by a first pixel actuator (TX1), the second (e.g., upper-right) imaging pixel 218b is actuated by a second pixel actuator (TX2), the third (e.g., lower-left) imaging pixel 218c is actuated by a third pixel actuator (TX3), and the fourth (e.g., lower-right) imaging pixel 218d is actuated by a fourth pixel actuator (TX4). Similarly, in each square array 720 of PDAF pixels 220, a first (e.g., upper-left) PDAF pixel 220 (a first first-disparity PDAF pixel 220Aa) is coupled with the first pixel actuator (TX1), a second (e.g., upper-right) PDAF pixel 220 (a first second-disparity PDAF pixel 220Ba) is coupled with the second pixel actuator (TX2), a third (e.g., lower-left) PDAF pixel 220 (a second second-disparity PDAF pixel 220Bb) is coupled with the third pixel actuator (TX3), and a fourth (e.g., lower-right) PDAF pixel 220 (a second first-disparity PDAF pixel 220Ab) is coupled with the fourth pixel actuator (TX4).

As described above, the controller can selectively actuate the pixel actuators to perform the consistently binned parallel readout of the pixel block 710d. At a first time, this can involve concurrently actuating the first and fourth pixel actuators; at a second time, this can involve concurrently actuating the second and third pixel actuators. As described above, a reset can occur between each of those times (e.g., before the first time and again before the second time). The concurrent actuation of the first and fourth pixel actuators causes diagonal binning of the first and second first-disparity PDAF pixels 220A in each square array 720 (binning of the "left" disparity information), and causes diagonal binning of the first imaging pixel 218a and the fourth imaging pixel 218d in each block of imaging pixels 218. Similarly, the concurrent actuation of the second and third pixel actuators causes diagonal binning of the first and second second-disparity PDAF pixels 220B in each square array 720 (binning of the "right" disparity information), and causes diagonal binning of the second imaging pixel 218b and the third imaging pixel 218c in each block of imaging pixels 218.

Figure 13:
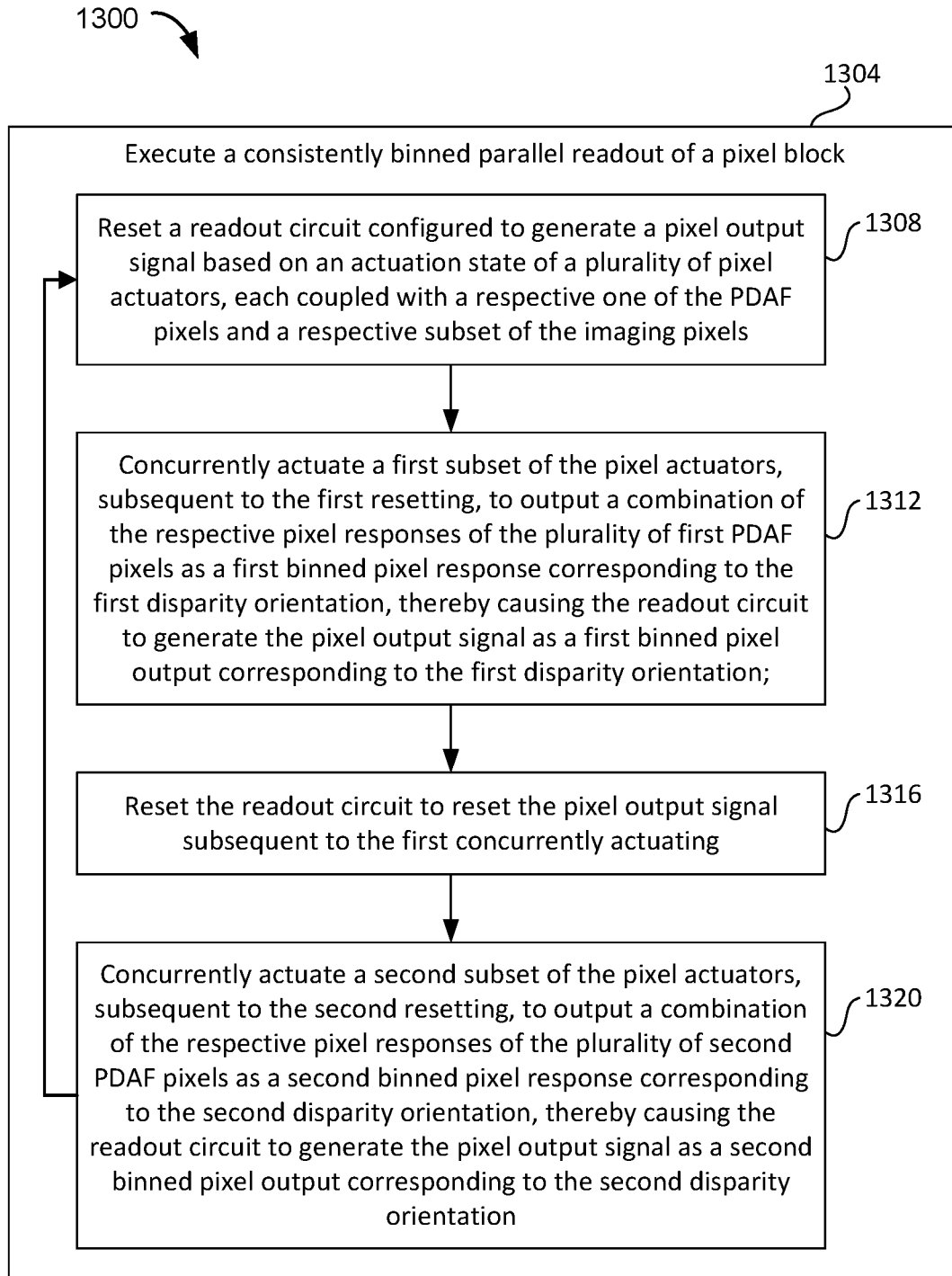
FIG. 13 shows a flow diagram of an illustrative method for disparity-preserving binning of PDAF pixels in an image sensor array, according to various embodiments described herein.

FIG. 13 shows a flow diagram of an illustrative method 1300 for disparity-preserving binning of PDAF pixels in an image sensor array, according to various embodiments described herein. Embodiments of the method 1300 include executing a consistently binned parallel readout of a pixel block at stage 1304. The pixel block is assumed to have an array of photodetector elements including at least one square array of PDAF pixels interspersed with a multiple imaging pixels, the at least one square array including multiple (e.g., two) first-disparity PDAF pixels each configured to generate a respective pixel response corresponding to a first disparity orientation, and multiple (e.g., two) second-disparity PDAF pixels each configured to generate a respective pixel response corresponding to a second disparity orientation that is complementary to the first disparity orientation (e.g., left-right, up-down, etc.). Such execution at stage 1304 can involve iteration through a number of stages, such as stages 1308-1320.

At stage 1308, embodiments can first reset a readout circuit configured to generate a pixel output signal based on an actuation state of multiple pixel actuators, each coupled with a respective one of the PDAF pixels and a respective subset of the imaging pixels. At stage 1312, embodiments can first concurrently actuate a first subset of the pixel actuators, subsequent to the first resetting, to output a combination of the respective pixel responses of the first-disparity PDAF pixels as a first binned pixel response corresponding to the first disparity orientation, thereby causing the readout circuit to generate the pixel output signal as a first binned pixel output corresponding to the first disparity orientation. At stage 1316, embodiments can second reset the readout circuit to reset the pixel output signal subsequent to the first concurrently actuating at stage 1312. At stage 1320, embodiments can second concurrently actuate a second subset of the pixel actuators, subsequent to the second resetting, to output a combination of the respective pixel responses of the second-disparity PDAF pixels as a second binned pixel response corresponding to the second disparity orientation, thereby causing the readout circuit to generate the pixel output signal as a second binned pixel output corresponding to the second disparity orientation.

In some embodiments, the first and second disparity orientations correspond to light arriving at the pixel block generally through left and right sides of a main imaging lens, respectively. In such embodiments, the concurrently actuating at stage 1312 causes vertical charge-binning of the respective pixel responses of the plurality of first-disparity PDAF pixels; and the concurrently actuating at stage 1320 causes vertical charge-binning of the respective pixel responses of the plurality of second-disparity PDAF pixels. In some such embodiments, the concurrently actuating at stage 1312 also causes diagonal charge-binning of respective pixel responses of the respective subsets of the imaging pixels coupled with the first subset of the pixel actuators; and the concurrently actuating at stage 1320 also causes diagonal charge-binning of respective pixel responses of the respective subsets of the imaging pixels coupled with the second subset of the pixel actuators.

In some embodiments, a first row of the array of photodetector elements includes, sequentially, a first PDAF pixel of the first-disparity PDAF pixels coupled with a first pixel actuator, a second PDAF pixel of the second-disparity PDAF pixels coupled with a second pixel actuator, a first imaging pixel coupled with the first pixel actuator, and a second imaging pixel coupled with the second pixel actuator; and a second row of the array of photodetector elements includes, sequentially, a third PDAF pixel of the first-disparity PDAF pixels coupled with a fourth pixel actuator, a fourth PDAF pixel of the second-disparity PDAF pixels coupled with a third pixel actuator, a third imaging pixel coupled with the third pixel actuator, and a fourth imaging pixel coupled with the fourth pixel actuator. In such embodiments, the concurrently actuating at stage 1312 includes actuating the first and fourth pixel actuators to cause vertical charge-binning of the respective pixel responses of the first and third PDAF pixels and diagonal charge-binning of respective pixel responses of the first and fourth imaging pixels during the consistently binned parallel readout of the pixel block; and the concurrently actuating at stage 1320 includes actuating the second and third pixel actuators to cause vertical charge-binning of the respective pixel responses of the second and fourth PDAF pixels and diagonal charge-binning of respective pixel responses of the second and third imaging pixels during the consistently binned parallel readout of the pixel block.

In some embodiments, a first row of the array of photodetector elements comprises, sequentially, a first PDAF pixel of the first-disparity PDAF pixels coupled with a first pixel actuator, a second PDAF pixel of the second-disparity PDAF pixels coupled with a second pixel actuator, a first imaging pixel coupled with a fifth pixel actuator, and a second imaging pixel coupled with a sixth pixel actuator; a second row includes, sequentially, a third PDAF pixel of first-disparity PDAF pixels coupled with a fourth pixel actuator, a fourth PDAF pixel of the second-disparity PDAF pixels coupled with a third pixel actuator, a third imaging pixel coupled with a seventh pixel actuator, and a fourth imaging pixel coupled with an eighth pixel actuator; a third row includes, sequentially, a fifth imaging pixel coupled with the first pixel actuator, a sixth imaging pixel coupled with the second pixel actuator, a fifth PDAF pixel of the first-disparity PDAF pixels coupled with the fifth pixel actuator, and a sixth PDAF pixel of the second-disparity PDAF pixels coupled with the sixth pixel actuator; and a fourth row includes, sequentially, a seventh imaging pixel coupled with the third pixel actuator, an eighth imaging pixel coupled with the fourth pixel actuator, a seventh PDAF pixel of the first-disparity PDAF pixels coupled with the eighth pixel actuator, and an eighth PDAF pixel of the second-disparity PDAF pixels coupled with the seventh pixel actuator. In such embodiments, the concurrently actuating at stage 1312 includes actuating the first, fourth, fifth, and eighth pixel actuators to cause vertical charge-binning of the respective pixel responses of the first, third, fifth, and seventh PDAF pixels and diagonal charge-binning of respective pixel responses of the first, fourth, fifth, and eighth imaging pixels during the consistently binned parallel readout of the pixel block; and the concurrently actuating at stage 1320 includes actuating the second, third, sixth, and seventh pixel actuators to cause vertical charge-binning of the respective pixel responses of the second, fourth, sixth, and eighth PDAF pixels and diagonal charge-binning of respective pixel responses of the second, third, sixth, and seventh imaging pixels during the consistently binned parallel readout of the pixel block.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary. Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. A system for disparity-preserving binning of phase-detect autofocus (PDAF) pixels in an image sensor array, the system comprising:
   a pixel block having an array of photodetector elements comprising at least one square array of PDAF pixels interspersed with a plurality of imaging pixels, the at least one square array comprising a plurality of first-disparity PDAF pixels each configured to generate a respective pixel response corresponding to a first disparity orientation, and a plurality of second-disparity PDAF pixels each configured to generate a respective pixel response corresponding to a second disparity orientation that is complementary to the first disparity orientation;

a plurality of pixel actuators, each coupled with a respective one of the PDAF pixels and a respective subset of the imaging pixels;

a controller to selectively actuate the plurality of pixel actuators to perform consistently binned parallel readout of the pixel block, such that the consistently binned parallel readout comprises:

concurrently actuating a first subset of the pixel actuators at a first time to output a combination of the respective pixel responses of the plurality of first-disparity PDAF pixels as a first binned pixel response corresponding to the first disparity orientation; and concurrently actuating a second subset of the pixel actuators at a second time to output a combination of the respective pixel responses of the plurality of second-disparity PDAF pixels as a second binned pixel response corresponding to the second disparity orientation.

2. The system of claim 1, further comprising:
a readout circuit electrically coupled with the plurality of pixel actuators to generate a pixel output signal based on an actuation state of the plurality of pixel actuators at each of a plurality of times during the consistently binned parallel readout, such that:

concurrently actuating the first subset of the pixel actuators causes the readout circuit to generate the pixel output signal at the first time as a first binned pixel output corresponding to the first disparity orientation; and concurrently actuating the second subset of the pixel actuators causes the readout circuit to generate the pixel output signal at the second time as a second binned pixel output corresponding to the second disparity orientation.

3. The system of claim 2, wherein:
each pixel actuator is coupled with the respective one of the PDAF pixels and at least some of the respective subset of the imaging pixels via a respective row-wise pixel actuation bus; and
the consistently binned parallel readout is a column-parallel readout of the pixel block.

4. The system of claim 1, wherein:
the first and second disparity orientations correspond to light arriving at the pixel block generally through left and right sides of a main imaging lens, respectively;
the concurrently actuating the first subset of the pixel actuators causes vertical charge-binning of the respective pixel responses of the plurality of first-disparity PDAF pixels; and
the concurrently actuating the second subset of the pixel actuators causes vertical charge-binning of the respective pixel responses of the plurality of second-disparity PDAF pixels.

5. The system of claim 1, wherein:
the concurrently actuating the first subset of the pixel actuators causes vertical charge-binning of the respective pixel responses of the plurality of first-disparity PDAF pixels and diagonal charge-binning of respective pixel responses of the respective subsets of the imaging pixels coupled with the first subset of the pixel actuators; and the concurrently actuating the second subset of the pixel actuators causes vertical charge-binning of the respective pixel responses of the plurality of second-disparity PDAF pixels and diagonal charge-binning of respective pixel responses of the respective subsets of the imaging pixels coupled with the second subset of the pixel actuators.

6. The system of claim 1, wherein the at least one square array of PDAF pixels comprises at least one 2-by-2 array of four PDAF pixels.

7. The system of claim 1, wherein the at least one square array of PDAF pixels comprises at least two 2-by-2 arrays, each of four PDAF pixels.

8. The system of claim 1, wherein:
a first row of the array of photodetector elements comprises, sequentially, a first PDAF pixel of the plurality of first-disparity PDAF pixels coupled with a first pixel actuator, a second PDAF pixel of the plurality of second-disparity PDAF pixels coupled with a second pixel actuator, a first imaging pixel coupled with the first pixel actuator, and a second imaging pixel coupled with the second pixel actuator;

a second row of the array of photodetector elements comprises, sequentially, a third PDAF pixel of the plurality of first-disparity PDAF pixels coupled with a fourth pixel actuator, a fourth PDAF pixel of the plurality of second-disparity PDAF pixels coupled with a third pixel actuator, a third imaging pixel coupled with the third pixel actuator, and a fourth imaging pixel coupled with the fourth pixel actuator;

concurrently actuating the first subset of the pixel actuators comprises actuating the first and fourth pixel actuators to cause vertical charge-binning of the respective pixel responses of the first and third PDAF pixels and diagonal charge-binning of respective pixel responses of the first and fourth imaging pixels during the consistently binned parallel readout of the pixel block; and concurrently actuating the second subset of the pixel actuators comprises actuating the second and third pixel actuators to cause vertical charge-binning of the respective pixel responses of the second and fourth PDAF pixels and diagonal charge-binning of respective pixel responses of the second and third imaging pixels during the consistently binned parallel readout of the pixel block.

9. The system of claim 1, wherein:
a first row of the array of photodetector elements comprises, sequentially, a first PDAF pixel of the plurality of first-disparity PDAF pixels coupled with a first pixel actuator, a second PDAF pixel of the plurality of second-disparity PDAF pixels coupled with a second pixel actuator, a first imaging pixel coupled with a fifth pixel actuator, and a second imaging pixel coupled with a sixth pixel actuator;

a second row of the array of photodetector elements comprises, sequentially, a third PDAF pixel of the plurality of first-disparity PDAF pixels coupled with a fourth pixel actuator, a fourth PDAF pixel of the plurality of second-disparity PDAF pixels coupled with a third pixel actuator, a third imaging pixel coupled with a seventh pixel actuator, and a fourth imaging pixel coupled with an eighth pixel actuator;

a third row of the array of photodetector elements comprises, sequentially, a fifth imaging pixel coupled with the first pixel actuator, a sixth imaging pixel coupled with the second pixel actuator, a fifth PDAF pixel of the plurality of first-disparity PDAF pixels coupled with the fifth pixel actuator, and a sixth PDAF pixel of the plurality of second-disparity PDAF pixels coupled with the sixth pixel actuator;
a fourth row of the array of photodetector elements comprises, sequentially, a seventh imaging pixel coupled with the third pixel actuator, an eighth imaging pixel coupled with the fourth pixel actuator, a seventh PDAF pixel of the plurality of first-disparity PDAF pixels coupled with the eighth pixel actuator, and an eighth PDAF pixel of the plurality of second-disparity PDAF pixels coupled with the seventh pixel actuator;
concurrently actuating the first subset of the pixel actuators comprises actuating the first, fourth, fifth, and eighth pixel actuators to cause vertical charge-binning of the respective pixel responses of the first, third, fifth, and seventh PDAF pixels and diagonal charge-binning of respective pixel responses of the first, fourth, fifth, and eighth imaging pixels during the consistently binned parallel readout of the pixel block; and
concurrently actuating the second subset of the pixel actuators comprises actuating the second, third, sixth, and seventh pixel actuators to cause vertical charge-binning of the respective pixel responses of the second, fourth, sixth, and eighth PDAF pixels and diagonal charge-binning of respective pixel responses of the second, third, sixth, and seventh imaging pixels during the consistently binned parallel readout of the pixel block.

10. The system of claim 1, wherein the pixel block further comprises at least one disparity-inducing structure disposed on top of the plurality of PDAF pixels to configure the plurality of first-disparity PDAF pixels to generate the respective pixel responses corresponding to the first disparity orientation and to configure the plurality of second-disparity PDAF pixels to generate the respective pixel responses corresponding to the second disparity orientation.

11. The system of claim 10, wherein the at least one square array is a 2-by-2 array, and the at least one disparity-inducing structure is a 2-by-2 on-chip lens disposed on top of the 2-by-2 array to cause the first and third PDAF pixels of the 2-by-2 array collectively to receive light generally from a first half of a main imaging lens, and to cause second and fourth PDAF pixels of the 2-by-2 array collectively to receive light generally from a second half of the main imaging lens.

12. The system of claim 10, wherein the at least one square array is a 2-by-2 array, and the at least one disparity-inducing structure comprises:
a first 1-by-2 on-chip lens disposed on top of first and second PDAF pixels of the 2-by-2 array to cause the first PDAF pixel to receive light generally from a first half of a main imaging lens and to cause the second PDAF pixel to receive light generally from a second half of the main imaging lens; and
a second 1-by-2 on-chip lens disposed on top of third and fourth PDAF pixels of the 2-by-2 array to cause the third PDAF pixel to receive light generally from the first half of the main imaging lens and to cause the fourth PDAF pixel to receive light generally from the second half of the main imaging lens.

13. The system of claim 10, wherein the at least one disparity-inducing structure comprises:
a plurality of first metal shields, each disposed on top of a respective one of the plurality of first PDAF pixels to cause the respective one of the plurality of first-disparity PDAF pixels to receive light generally from a first half of a main imaging lens;
a plurality of second metal shields, each disposed on top of a respective one of the plurality of second PDAF pixels to cause the respective one of the plurality of second-disparity PDAF pixels to receive light generally from a second half of a main imaging lens.

14. The system of claim 13, wherein:
the at least one square array is a 2-by-2 array having sequentially:
in a first row, a first PDAF pixel of the plurality of first-disparity PDAF pixels and a second PDAF pixel of the plurality of second-disparity PDAF pixels; and
in a second row, a third PDAF pixel of the plurality of second-disparity PDAF pixels and a fourth PDAF pixel of the plurality of first-disparity PDAF pixels;
the concurrently actuating the first subset of the pixel actuators causes diagonal charge-binning of the respective pixel responses of the plurality of first-disparity PDAF pixels; and
the concurrently actuating the second subset of the pixel actuators causes diagonal charge-binning of the respective pixel responses of the plurality of second-disparity PDAF pixels.

15. The system of claim 1, further comprising:
an image sensor array comprising a plurality of instances of the pixel block.

16. A method for disparity-preserving binning of phase-detect autofocus (PDAF) pixels in an image sensor array, the method comprising:
executing a consistently binned parallel readout of a pixel block having an array of photodetector elements comprising at least one square array of PDAF pixels interspersed with a plurality of imaging pixels, the at least one square array comprising a plurality of first-disparity PDAF pixels each configured to generate a respective pixel response corresponding to a first disparity orientation, and a plurality of second-disparity PDAF pixels each configured to generate a respective pixel response corresponding to a second disparity orientation that is complementary to the first disparity orientation, the executing comprising:
first resetting a readout circuit configured to generate a pixel output signal based on an actuation state of a plurality of pixel actuators, each coupled with a respective one of the PDAF pixels and a respective subset of the imaging pixels;
first concurrently actuating a first subset of the pixel actuators, subsequent to the first resetting, to output a combination of the respective pixel responses of the plurality of first-disparity PDAF pixels as a first binned pixel response corresponding to the first disparity orientation, thereby causing the readout circuit to generate the pixel output signal as a first binned pixel output corresponding to the first disparity orientation;
second resetting the readout circuit to reset the pixel output signal subsequent to the first concurrently actuating; and
second concurrently actuating a second subset of the pixel actuators, subsequent to the second resetting, to output a combination of the respective pixel responses of the plurality of second-disparity PDAF pixels as a second binned pixel response corresponding to the second disparity orientation, thereby causing the readout circuit to generate the pixel output signal as a second binned pixel output corresponding to the second disparity orientation.

17. The method of claim 16, wherein:
the first and second disparity orientations correspond to light arriving at the pixel block generally through left and right sides of a main imaging lens, respectively;
the first concurrently actuating causes vertical charge-binning of the respective pixel responses of the plurality of first-disparity PDAF pixels; and
the second concurrently actuating causes vertical charge-binning of the respective pixel responses of the plurality of second-disparity PDAF pixels.

18. The method of claim 16, wherein:
the first concurrently actuating causes vertical charge-binning of the respective pixel responses of the plurality of first-disparity PDAF pixels and diagonal charge-binning of respective pixel responses of the respective subsets of the imaging pixels coupled with the first subset of the pixel actuators; and
the second concurrently actuating causes vertical charge-binning of the respective pixel responses of the plurality of second-disparity PDAF pixels and diagonal charge-binning of respective pixel responses of the respective subsets of the imaging pixels coupled with the second subset of the pixel actuators.

19. The method of claim 16, wherein:
a first row of the array of photodetector elements comprises, sequentially, a first PDAF pixel of the plurality of first-disparity PDAF pixels coupled with a first pixel actuator, a second PDAF pixel of the plurality of second-disparity PDAF pixels coupled with a second pixel actuator, a first imaging pixel coupled with the first pixel actuator, and a second imaging pixel coupled with the second pixel actuator;
a second row of the array of photodetector elements comprises, sequentially, a third PDAF pixel of the plurality of first-disparity PDAF pixels coupled with a fourth pixel actuator, a fourth PDAF pixel of the plurality of second-disparity PDAF pixels coupled with a third pixel actuator, a third imaging pixel coupled with the third pixel actuator, and a fourth imaging pixel coupled with the fourth pixel actuator;
the first concurrently actuating comprises actuating the first and fourth pixel actuators to cause vertical charge-binning of the respective pixel responses of the first and third PDAF pixels and diagonal charge-binning of respective pixel responses of the first and fourth imaging pixels during the consistently binned parallel readout of the pixel block; and
the second concurrently actuating comprises actuating the second and third pixel actuators to cause vertical charge-binning of the respective pixel responses of the second and fourth PDAF pixels and diagonal charge-binning of respective pixel responses of the second and third imaging pixels during the consistently binned parallel readout of the pixel block.

20. The method of claim 16, wherein:
a first row of the array of photodetector elements comprises, sequentially, a first PDAF pixel of the plurality of first-disparity PDAF pixels coupled with a first pixel actuator, a second PDAF pixel of the plurality of second-disparity PDAF pixels coupled with a second pixel actuator, a first imaging pixel coupled with a fifth pixel actuator, and a second imaging pixel coupled with a sixth pixel actuator;
a second row of the array of photodetector elements comprises, sequentially, a third PDAF pixel of the plurality of first-disparity PDAF pixels coupled with a fourth pixel actuator, a fourth PDAF pixel of the plurality of second-disparity PDAF pixels coupled with a third pixel actuator, a third imaging pixel coupled with a seventh pixel actuator, and a fourth imaging pixel coupled with an eighth pixel actuator;
a third row of the array of photodetector elements comprises, sequentially, a fifth imaging pixel coupled with the first pixel actuator, a sixth imaging pixel coupled with the second pixel actuator, a fifth PDAF pixel of the plurality of first-disparity PDAF pixels coupled with the fifth pixel actuator, and a sixth PDAF pixel of the plurality of second-disparity PDAF pixels coupled with the sixth pixel actuator;
a fourth row of the array of photodetector elements comprises, sequentially, a seventh imaging pixel coupled with the third pixel actuator, an eighth imaging pixel coupled with the fourth pixel actuator, a seventh PDAF pixel of the plurality of first-disparity PDAF pixels coupled with the eighth pixel actuator, and an eighth PDAF pixel of the plurality of second-disparity PDAF pixels coupled with the seventh pixel actuator;
the first concurrently actuating comprises actuating the first, fourth, fifth, and eighth pixel actuators to cause vertical charge-binning of the respective pixel responses of the first, third, fifth, and seventh PDAF pixels and diagonal charge-binning of respective pixel responses of the first, fourth, fifth, and eighth imaging pixels during the consistently binned parallel readout of the pixel block; and
the second concurrently actuating comprises actuating the second, third, sixth, and seventh pixel actuators to cause vertical charge-binning of the respective pixel responses of the second, fourth, sixth, and eighth PDAF pixels and diagonal charge-binning of respective pixel responses of the second, third, sixth, and seventh imaging pixels during the consistently binned parallel readout of the pixel block.

\* \* \* \* \*